United States Patent
Hara et al.

(10) Patent No.: US 6,957,874 B2
(45) Date of Patent: Oct. 25, 2005

(54) BRAKING FORCE CONTROL APPARATUS FOR A VEHICLE

(75) Inventors: Masahiro Hara, Susono (JP);
Toshihisa Nihei, Mishima (JP);
Naruyuki Matsui, Gotemba (JP);
Masahiro Matsuura, Chiryu (JP)

(73) Assignees: Toyota Jidosha Kabushiki Kaisha, Toyota (JP); Denso Corporation, Kariya (JP)

(*) Notice: Subject to any disclaimer, the term of this patent is extended or adjusted under 35 U.S.C. 154(b) by 18 days.

(21) Appl. No.: 10/156,051

(22) Filed: May 29, 2002

(65) Prior Publication Data

US 2002/0180266 A1 Dec. 5, 2002

(30) Foreign Application Priority Data

May 30, 2001 (JP) ........................................ 2001-163221

(51) Int. Cl.[7] .............................................. B60T 8/58
(52) U.S. Cl. ...................................... 303/152; 180/165
(58) Field of Search ................................ 303/3.15, 152, 303/113.1; 180/165, 147, 65.1–65.7

(56) References Cited

U.S. PATENT DOCUMENTS

| 4,962,969 | A | * | 10/1990 | Davis | 303/3 |
| 5,378,053 | A | * | 1/1995 | Patient et al. | 303/3 |
| 5,472,265 | A | | 12/1995 | Ohnuma | |
| 5,511,859 | A | * | 4/1996 | Kade et al. | 303/3 |
| 5,853,229 | A | * | 12/1998 | Willmann et al. | 303/3 |
| 6,231,134 | B1 | | 5/2001 | Fukasawa et al. | |
| 6,488,344 | B2 | * | 12/2002 | Huls et al. | 303/152 |

FOREIGN PATENT DOCUMENTS

| DE | 44 35 953 A1 | 5/1995 |
| DE | 44 43 814 C1 | 2/1996 |
| DE | 196 22 017 A1 | 12/1996 |
| DE | 198 47 472 A1 | 3/1999 |
| JP | A-06-153316 A | 5/1994 |
| JP | A-06-171489 | 6/1994 |
| JP | A-11-078839 | 3/1999 |
| JP | A 2000-62590 | 2/2000 |

* cited by examiner

*Primary Examiner*—Matthew C. Graham
(74) *Attorney, Agent, or Firm*—Oliff & Berridge, PLC

(57) ABSTRACT

Each of target braking forces for front and rear wheels of a vehicle is calculated based on an amount of braking performed by a driver and a predetermined braking force distribution ratio between the front wheels and the rear wheels. Each of the target regenerative braking forces for the front and rear wheels, respectively, is calculated based on a corresponding one of the target braking forces such that a maximum regeneration efficiency is obtained. If the driver has performed an abrupt braking operation, if the driver has performed a braking operation when the vehicle runs at a high deceleration, or if the vehicle runs at a high lateral speed, it is quite likely that anti-skid control will be started afterwards. Therefore, the target regenerative braking forces are gradually reduced, and target frictional braking forces are gradually increased. If anti-skid control is started, the target regenerative braking forces are set as 0.

64 Claims, 8 Drawing Sheets

BRAKING FORCE CONTROL APPARATUS FOR A VEHICLE

INCORPORATION BY REFERENCE

The disclosure of Japanese Patent Application No. 2001-163221 filed on May 30, 2001 including the specification, drawings, and abstract is incorporated herein by reference in its entirety.

BACKGROUND OF THE INVENTION

1. Field of Invention

The invention relates to a braking force control apparatus for a vehicle, and more particularly, to a braking force control apparatus for a vehicle which has a regenerative braking device and a frictional braking device and in which anti-skid control is performed.

2. Description of Related Art

A braking force control apparatus for an automobile or the like having a regenerative braking device and a frictional braking device is disclosed, for example, in Japanese Patent Application No. 2000-62590, which is one of the applications filed by the present applicant. In a vehicle having a regenerative braking device and a frictional braking device, the sum of a regenerative braking force and a frictional braking force is applied to the vehicle as a total braking force. A braking force control apparatus according to a known related art is designed to set the regenerative braking force as 0 and make supplementation with a braking force corresponding to a regenerative braking force that has been reduced by a frictional braking device.

According to such a braking force control apparatus, if a braking slip amount in a certain wheel becomes excessively great, anti-skid control is started as to the wheel. Because the regenerative braking force applied to the wheel becomes equal to 0, anti-skid control is performed suitably without adversely affecting the regenerative braking force. Even if the regenerative braking force has become equal to 0, an abrupt decrease in deceleration of the vehicle at the beginning of anti-skid control is suppressed as compared to the case where the braking force generated by the frictional braking device is not supplemented with the braking force corresponding to the regenerative braking force that has become equal to 0.

However, according to a conventional braking force control apparatus as described above, the regenerative braking force is reduced to 0 abruptly as soon as anti-skid control is started. However, it is difficult to precisely and duly supplement the reduced regenerative braking force with a braking force corresponding to an amount of decrease in the regenerative braking force by means of the frictional braking device. Accordingly, an abrupt fluctuation in deceleration of the vehicle, which is caused by reducing the regenerative braking force to 0 at the beginning of anti-skid control, cannot be suppressed effectively. An improvement must be made in this respect to enhance driveability of the vehicle.

SUMMARY OF THE INVENTION

The invention has been made in quest of a solution to the aforementioned problem occurring in a braking control apparatus for a vehicle which has a regenerative braking device and a frictional braking device and in which anti-skid control is performed. It is a main objective of the invention to ensure that the regenerative braking force and the frictional braking force are gradually reduced and increased respectively if anti-skid control is likely to be started and to ensure that an abrupt fluctuation in deceleration of the vehicle is prevented reliably and effectively during the start of anti-skid control, while preventing the regenerative braking force from being abruptly reduced to 0 as soon as anti-skid control is started.

According to the invention, the aforementioned main objective can be achieved by a braking force control apparatus for a vehicle comprising a regenerative braking device for performing regenerative braking, a frictional braking device for performing frictional braking, and a controller which gradually reduces a regenerative braking force and gradually increases a frictional braking force if it is determined that anti-skid control is likely to be started and which stops the regenerative braking and supplements a braking force by means of the frictional braking device if anti-skid control is started.

DETAILED DESCRIPTION OF PREFERRED EMBODIMENTS

Hereinafter, a preferred exemplary embodiment of the invention will be described in detail with reference to the accompanying drawings.

Figure 1:
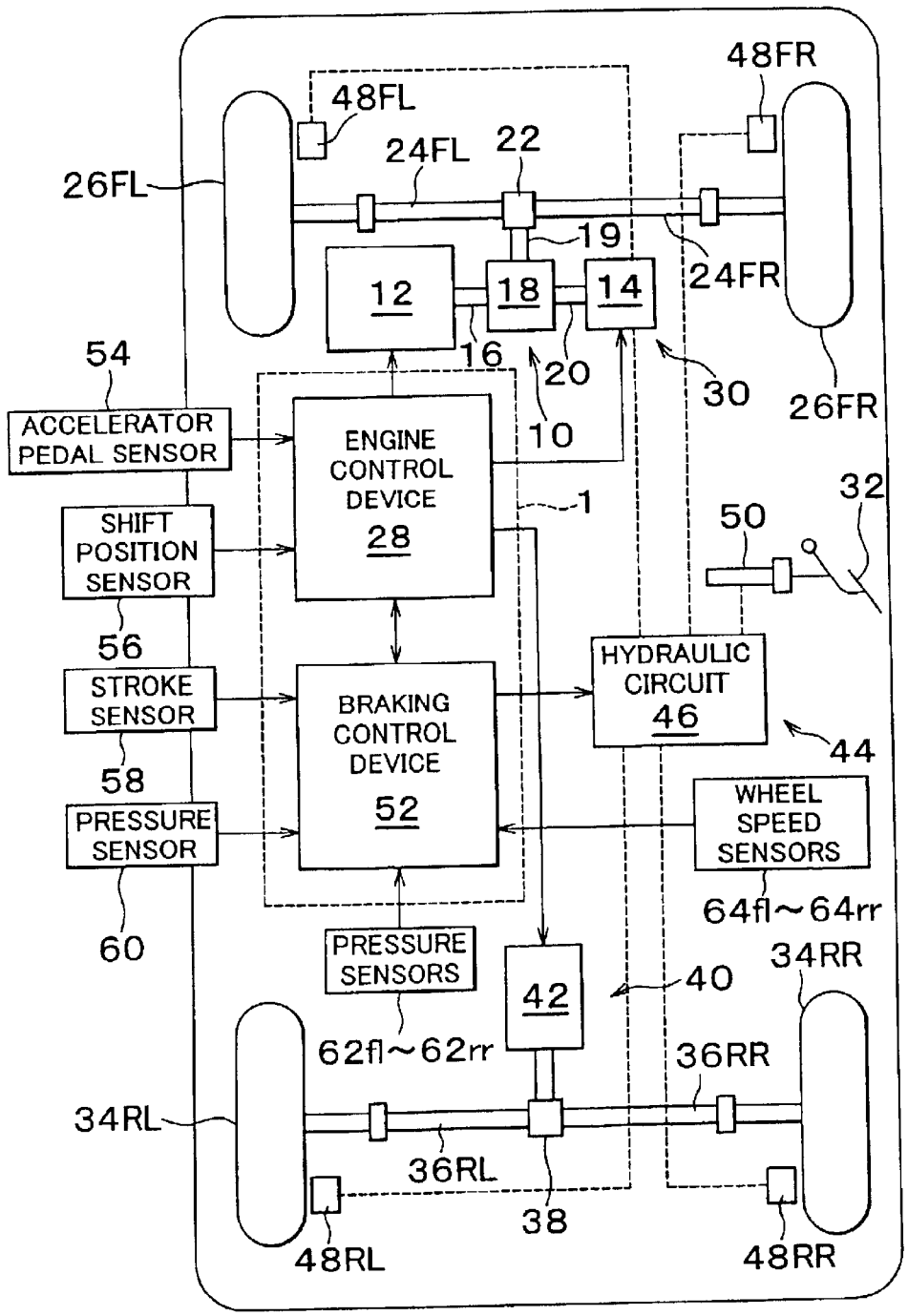
FIG. 1 is a schematic structural view of a braking force control apparatus according to an exemplary embodiment of the invention, the braking force control apparatus being applied to a front-wheel drive vehicle that has regenerative and frictional braking devices in front and rear wheels and that is equipped with a hybrid engine.

FIG. 1 is a schematic structural view of a braking force control apparatus according to an exemplary embodiment of the invention, the braking force control apparatus being applied to a front-wheel drive vehicle that has regenerative and frictional braking devices in front and rear wheels and is equipped with a hybrid engine.

In FIG. 1, a hybrid engine 10 drives the front wheels of the vehicle. The hybrid engine 10 includes a gasoline engine 12 and a motor generator 14. An output shaft 16 of a gasoline engine 12 is coupled to an input shaft of a continuously variable transmission 18 into which clutches are built. The input shaft of the continuously variable transmission 18 is also coupled to an output shaft 20 of the motor generator 14. Rotation of an output shaft 19 of the continuously variable transmission 18 is transmitted to front-left and front-right axles 24FL, 24FR via a front differential 22, whereby the front-left and front-right wheels 26FL, 26FR are driven rotationally.

An engine control device 28 controls the gasoline engine 12 and the motor generator 14 of the hybrid engine 10 in accordance with a depression amount of an accelerator pedal (not shown) operated by the driver and a running condition of the vehicle. The motor generator 14 also functions as a generator for a regenerative braking device 30 for the front wheels. The engine control device 28 also controls the function of the motor generator 14 as a regenerative generator (regenerative braking).

Especially in the exemplary embodiment shown in the drawings, during normal running (normal operation mode) of the vehicle in which a shift lever (not shown) is in a drive, i.e., D range, the hybrid engine 10 generates a driving force or an engine braking force either by the gasoline engine 12 or by the gasoline engine 12 and the motor generator 14. When a low load is applied despite the shift lever being set in the D range, only the motor generator 14 generates a driving force (e.g., electric vehicle mode). When the shift lever is in an engine braking, i.e., B range as well, the gasoline engine 12 and the motor generator 14 generate a driving force or an engine braking force. However, in the case where the shift lever is in the B range, the engine braking force is greater as compared to when the shift lever is in the D range, which helps to perform regenerative braking of the motor generator 14 (e.g., engine braking mode). Also, if the driver depresses a brake pedal 32 with the shift lever set in the D range, the motor generator 14 functions as a regenerative generator.

In FIG. 1, rotations of the rear-left and rear-right wheels 34RL, 34RR as driven wheels are transmitted to a motor generator 42 of a regenerative braking device 40 for the rear wheels via rear-left and rear-right axles 36RL, 36RR and a rear-wheel differential 38. The engine control device 28 also controls regenerative braking by the motor generator 42. Thus, the engine control device 28 functions as a control device for the regenerative braking device.

A hydraulic circuit 46 of a frictional braking device 44 controls braking pressures applied to wheel cylinders 48FL, 48FR, 48RL, and 48RR, whereby frictional braking forces applied to the front-left and front-right wheels 26FL, 26FR and the rear-left and rear-right wheels 34RL, 34RR are controlled. The front-left and front-right wheels 26FL, 26FR and the rear-left and rear-right wheels 34RL, 34RR correspond to the wheel cylinders 48FL, 48FR, 48RL, and 48RR, respectively. Although not shown in FIG. 1, the hydraulic circuit 46 includes a reservoir, an oil pump, various valve mechanisms, and the like. During normal operation, a braking control device 52 as a control device for the frictional braking device controls braking pressures applied to the wheel cylinders 48FL, 48FR, 48RL, and 48RR in accordance with a depression amount of the brake pedal 32 operated by the driver and a pressure of a master cylinder 50 that is driven in accordance with depression of the brake pedal 32. It is to be noted herein that the engine control device 28 as the control device for the regenerative braking device and the braking control device 52 as the control device for the frictional braking device are comprehensively referred to as a braking force control apparatus 1.

A signal indicating a depression amount of an accelerator pedal is input from an accelerator pedal sensor 54 to the engine control device 28. Also, a signal indicating a shift position of the continuously variable transmission 18 is input from a shift position sensor 56 to the engine control device 28. Furthermore, signals indicating a target regenerative braking force Frgft for the front wheels and a target regenerative braking force Frgrt for the rear wheels are input from the braking control device 52 to the engine braking device 28.

A signal indicating a depression stroke Sp of the brake pedal 32 is input from a stroke sensor 58 to the braking control device 52. Also, a signal indicating a pressure Pm of the master cylinder 50 is input from a pressure sensor 60 to the braking control device 52. Furthermore, signals indicating braking pressures Pfl, Pfr, Prl, and Prr applied to the wheel cylinders 48FL, 48FR, 48RL, and 48RR of the front-left and front-right wheels and the rear-left and rear-right wheels are input from pressure sensors 62$fl$, 62$fr$, 62$rl$, and 62$rr$ to the braking control device 52, respectively. In addition, signals indicating speeds Vwfl, Vwfr, Vwrl, and Vwrr of the front-left and front-right wheels and the rear-left and rear-right wheels are input from wheel speed sensors 64$fl$, 64$fr$, 64$rl$, and 64$rr$ to the braking control device 52, respectively.

In fact, it is appropriate that the engine control device 28 and the braking control device 52 be realized as a standard construction with a driving circuit and a microcomputer including a CPU, a ROM, a RAM, and an I/O device.

Figure 2:
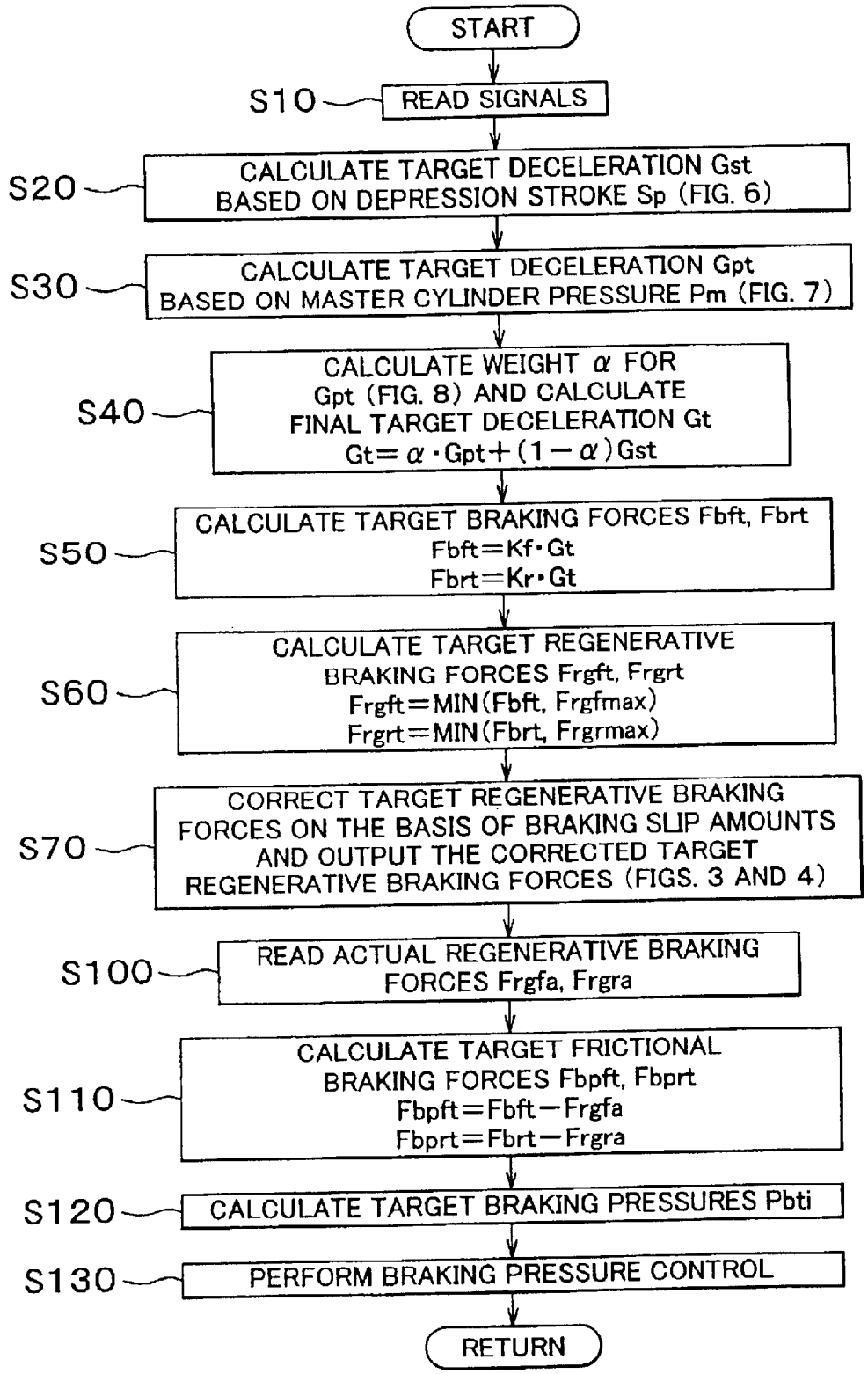
FIG. 2 is a flowchart showing a braking force control routine executed by the braking force control apparatus according to the exemplary embodiment shown in FIG. 1.

The braking control device 52 performs braking force control according to a routine shown in FIG. 2 as will be described later. The braking control device 52 calculates a final target deceleration Gt of the vehicle as a braking amount required by the driver, on the basis of the depression stroke Sp of the brake pedal 32 and the master cylinder pressure Pm. Further, the braking control device 52 calculates the target braking force Fbft for the front wheels and the target braking force Fbrt for the rear wheels on the basis of the final target deceleration Gt and a predetermined braking force distribution ratio between the front and rear wheels. Furthermore, the braking control device 52 calculates the smaller one of the target braking force Fbft and a maximum regenerative braking force Frgfmax of the regenerative braking device 30 for the front wheels, as a target regenerative braking force Frgft for the front wheels. Similarly, the braking control device 52 calculates the smaller one of the target braking force Fbrt and a maximum regenerative braking force Frgrmax of the regenerative braking device 40 for the rear wheels, as a target regenerative braking force Frgrt for the rear wheels. The braking control device 52 then outputs signals indicating the target regenerative braking force Frgft for the front wheels and the target regenerative braking force Frgrt for the rear wheels to the engine control device 28.

The engine control device 28 controls the motor generator 14 of the regenerative braking device 30 for the front wheels with the target regenerative braking force Frgft for the front wheels defined as an upper limit. The engine control device 28 calculates an actual regenerative braking force Frgfa generated by the regenerative braking device 30 for the front wheels on the basis of a voltage and a current generated by the motor generator 14. Similarly, the engine control device 28 controls the motor generator 42 of the regenerative braking device 40 for the rear wheels with the target regenerative braking force Frgrt defined as an upper limit. The engine control device 28 calculates an actual regenerative braking force Frgra generated by the regenerative braking device 40 for the rear wheels on the basis of a voltage and a current generated by the motor generator 42. Furthermore, the engine control device 28 outputs signals indicating the actual regenerative braking forces Frgfa, Frgra to the braking control device 52.

The braking control device 52 calculates a value obtained by subtracting the actual regenerative braking force Frgfa from the target braking force Fbft, as a target frictional braking force Fbpft for the front wheels. Similarly, the braking control device 52 calculates a value obtained by subtracting the actual regenerative braking force Frgra from the target braking force Fbrt, as a target frictional braking force Fbprt for the rear wheels. Furthermore, the braking control device 52 calculates target braking pressures Pbtfl, Pbtfr for the front-left and front-right wheels on the basis of the target frictional braking force Fbpft for the front wheels. Further, the braking control device 52 calculates target braking pressures Pbtrl, Pbtrr for the rear-left and rear-right wheels on the basis of the target frictional braking force Fbprt for the rear wheels. The braking control device 52 controls braking pressures Pi (i=fl, fr, rl, rr) applied to the front-left and front-right wheels and the rear-left and rear-right wheels such that the braking pressures become equal to target braking pressures Pbti (i=fl, fr, rl, rr) respectively.

Furthermore, the braking control device 52 calculates a vehicle speed Vb and braking slip amounts SLi (i=fl, fr, rl, rr) of the wheels on the basis of wheel speeds Vwi(i=fl, fr, rl, rr), according to a method known in the technical field of the invention. If the braking slip amount SLi of any one of the wheels becomes greater than SLa so that a condition for starting anti-skid control (hereinafter referred to as ABS control) is fulfilled, ABS control is performed until a condition for terminating ABS control is fulfilled. It is to be noted herein that SLa is a positive constant as a threshold for starting ABS control. In ABS control, the pressure in each of the wheel cylinders is increased or reduced so that the braking slip amount of a corresponding one of the wheels falls within a predetermined range. If ABS control is being performed to at least one of the front-left and front-right wheels, the braking control device 52 sets the target regenerative braking force Frgft for the front wheels as 0. Further, if ABS control is being performed to at least either the left wheels or the right wheels, the braking control device 52 sets the target regenerative braking force Frgrt for the rear wheels as 0.

Further, if the braking slip amount SLfl of the front-left wheel or the braking slip amount SLfr of the front-right wheel is greater than a reference value SLb, the braking control device 52 gradually reduces the target regenerative braking force Frgft for the front wheels prior to the start of ABS control. If the braking slip amount SLi of any one of the wheels is greater than the reference value SLb, or if ABS control is being performed to at least one of the front-left and front-right wheels, then the braking control device 52 gradually reduces the target regenerative braking force Frgrt for the rear wheels. It is to be noted herein that SLb is a positive constant smaller than the threshold SLa for starting ABS control.

If the driver performs an abrupt braking operation or if a braking operation is performed when the vehicle runs at a high deceleration, excessively great braking forces tend to be applied to the wheels. If the vehicle runs at a high lateral acceleration, the surface load applied to the gyrationally inner wheels decreases, and braking forces that can be generated by the gyrationally inner wheels decrease, whereby excessively great braking forces tend to be applied to the gyrationally inner wheels. In either case, there is a strong possibility that ABS control will be started afterwards. Accordingly, in each of the aforementioned cases, the braking control device 52 gradually reduces the target regenerative braking force Frgft for the front wheels and the target regenerative braking force Frgrt for the rear wheels prior to the start of ABS control.

It is to be noted herein that control of the operation mode of the hybrid engine 10 performed by the engine control device 28 and control of the gasoline engine 12 performed by the engine control device 28 do not constitute the gist of the invention and may be performed according to an arbitrary method known in the technical field of the invention.

Figure 3:
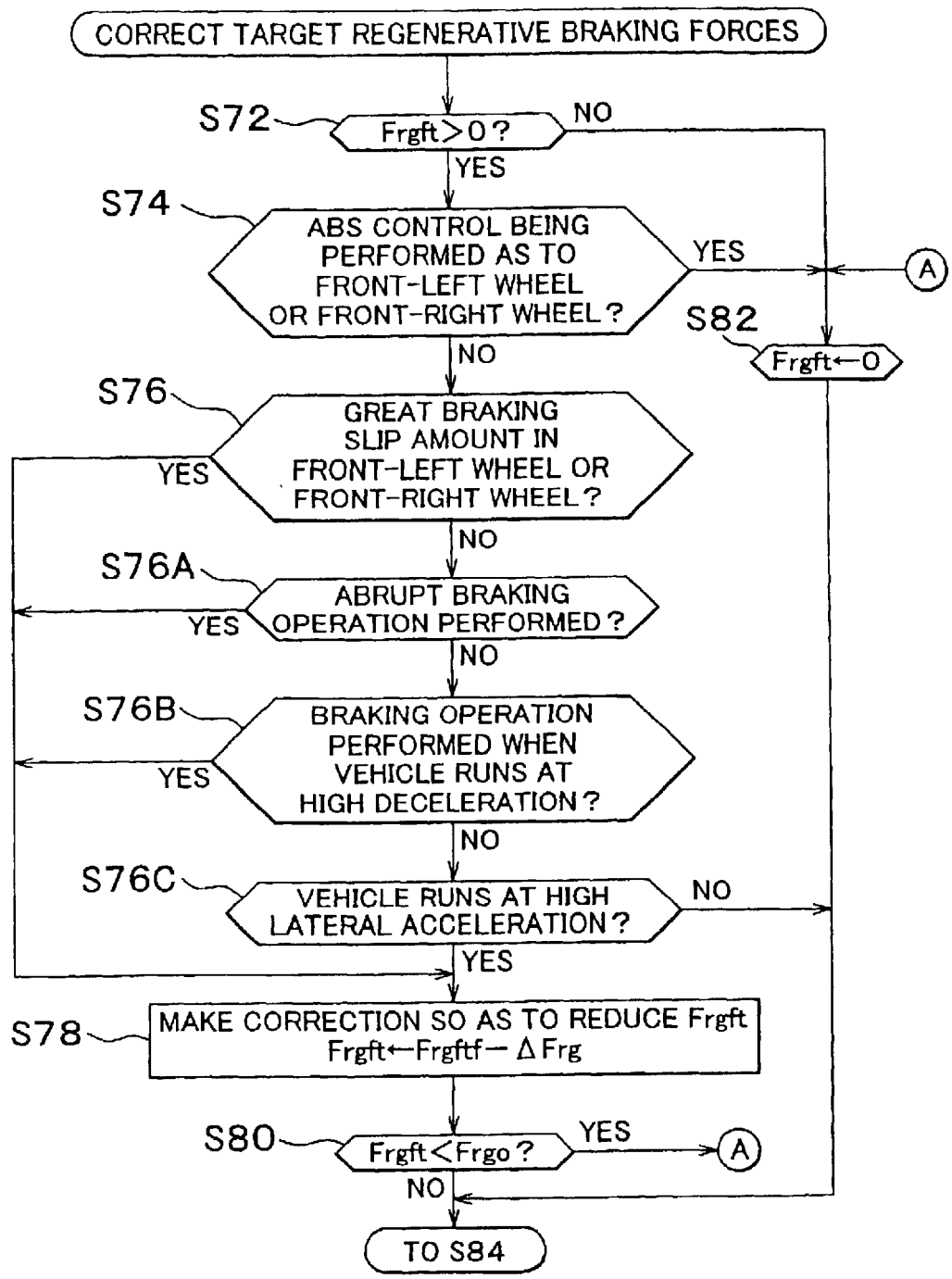
FIG. 3 is a flowchart showing the first half of a target regenerative braking force correction routine for the front and rear wheels in step 70.
Figure 4:
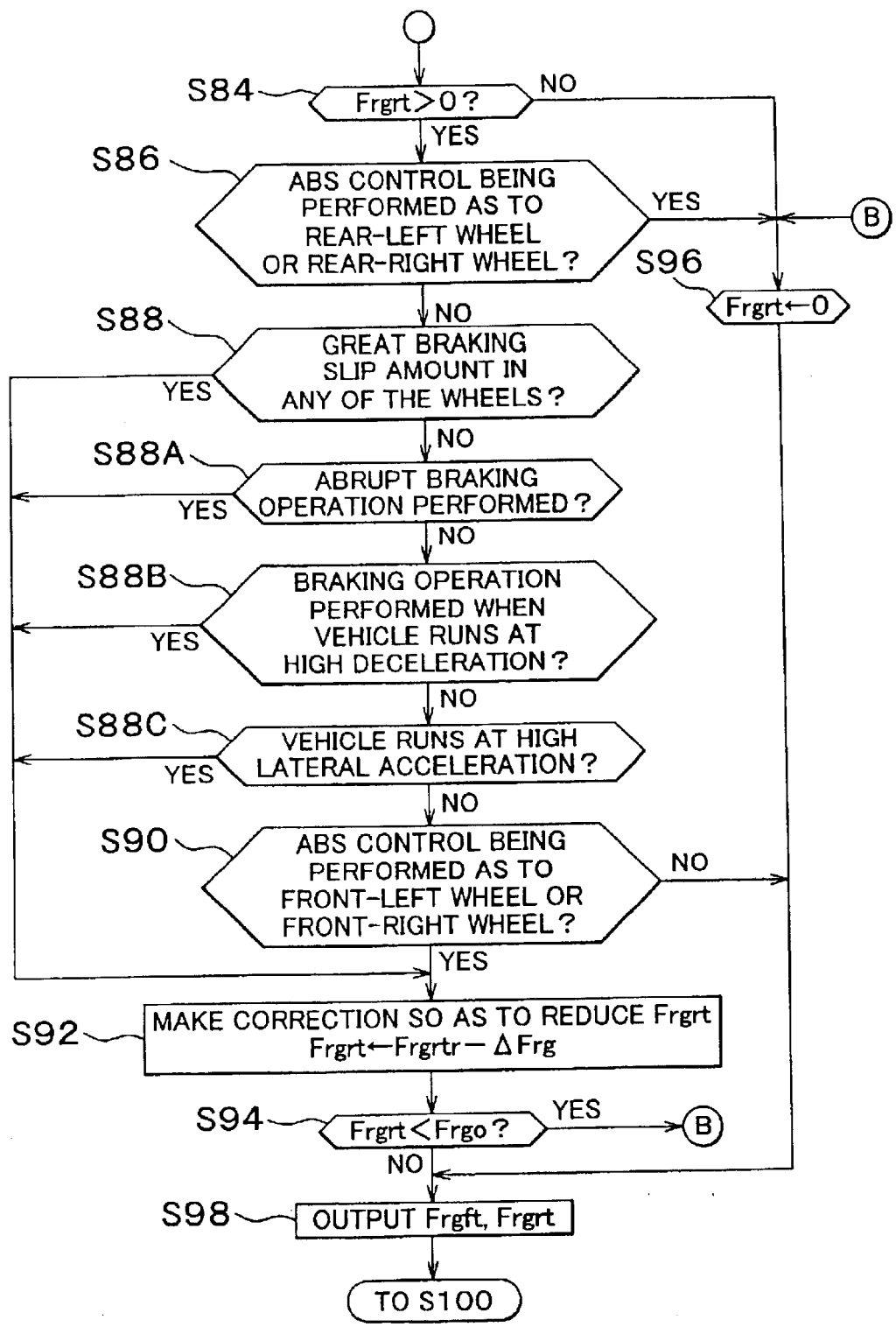
FIG. 4 is a flowchart showing the second half of the target regenerative braking force correction routine for the front and rear wheels in step 70.

A braking force control routine executed by the braking control device 52 according to the exemplary embodiment shown in the drawings will now be described with reference to flowcharts shown in FIGS. 2 to 4. It is to be noted herein that control based on the flowcharts shown in FIGS. 2 to 4 is started by opening an ignition switch (not shown) and is performed repeatedly at intervals of a predetermined period.

First of all in step 10, a signal indicating the depression stroke Sp of the brake pedal 32 detected by the stroke sensor 58 and a signal indicating the pressure Pm of the master cylinder 50 detected by the pressure sensor 60 are read.

Figure 6:
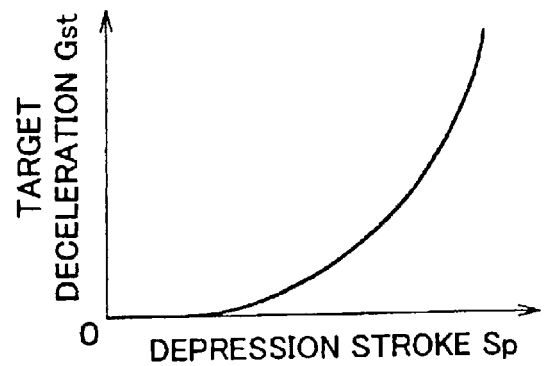
FIG. 6 is a graph showing a relation between depression stroke Sp of a brake pedal and target deceleration Gst.

In step 20, a target deceleration Gst based on the depression stroke Sp is calculated by means of a map corresponding to a graph shown in FIG. 6.

Figure 7:
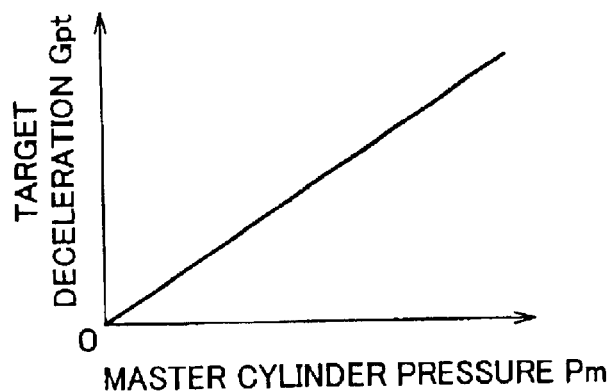
FIG. 7 is a graph showing a relation between master cylinder pressure Pm and target deceleration Gpt.

In step 30, a target deceleration Gpt based on the master cylinder pressure Pm is calculated by means of a map corresponding to a graph shown in FIG. 7.

Figure 8:
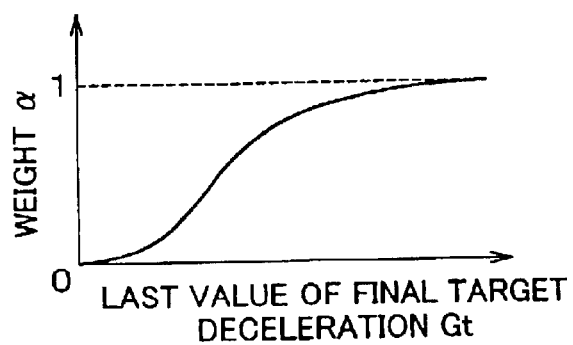
FIG. 8 is a graph showing a relation between last-calculated final target deceleration Gt and weight α for target deceleration Gt.

In step 40, a weight $\alpha (0 \leq \alpha \leq 1)$ for the target deceleration Gpt based on the master cylinder pressure Pm is calculated by means of a map corresponding to a graph shown in FIG. 8, on the basis of the final target deceleration Gt calculated during the last cycle. In step 40, the final target deceleration Gt is calculated as a weighted sum of the target deceleration Gpt and the target deceleration Gst according to an equation 1 shown below.

$$Gt = \alpha \cdot Gpt + (1-\alpha)Gst \tag{1}$$

In step 50, the target braking force Fbft for the front wheels and the target braking force Fbrt for the rear wheels are calculated according to equations 2 and 3 shown below, wherein Kf and Kr represent braking force distribution ratios (positive constants) for the front wheels and the rear wheels respectively.

$$Fbft = Kf \cdot Gt \tag{2}$$

$$Fbrt = Kr \cdot Gt \tag{3}$$

In step 60, the target regenerative braking force Frgft for the front wheels and the target regenerative braking force Frgrt for the rear wheels are calculated according to equations 4 and 5 shown below, respectively. It is to be noted herein that MIN in each of the equations 4 and 5 means selecting the smaller one of values in parentheses. It is appropriate that the maximum regenerative braking forces Frgfmax, Frgrmax be positive constants. It is also appropriate that the maximum regenerative braking forces Frgfmax, Frgrmax be set variably in accordance with an operation mode or a vehicle speed.

$$Frgft = MIN(Fbft, Frgfmax) \quad (4)$$

$$Frgrt = MIN(Fbrt, Frgrmax) \quad (5)$$

In step 70, the target regenerative braking force Frgft for the front wheels and the target regenerative braking force Frgrt for the rear wheels are corrected according to the flowchart shown in FIG. 3, depending on braking slip states of the wheels. In step 70, signals indicating the target regenerative braking forces Frgft, Frgrt are output to the engine control device 28.

In step 100, the engine control device 28 reads signals indicating the actual regenerative braking force Frgfa for the front wheels and the actual regenerative braking force Frgra for the rear wheels. As will be described later, the actual regenerative braking forces Frgfa, Frgra are obtained through regenerative braking control performed by the engine control device 28.

In step 110, the target frictional braking force Fbpft for the front wheels and the target frictional braking force Fbprt for the rear wheels are calculated according to equations 6 and 7 shown below, respectively.

$$Fbpft = Fbft - Frgfa \quad (6)$$

$$Fbprt = Fbrt - Frgra \quad (7)$$

In step 120, the target braking pressures Pbtfl, Pbtfr for the front-left and front-right wheels are calculated on the basis of the target frictional braking force Fbpft for the front wheels. Further, in step 120, the target braking pressures Pbtrl, Pbtrr for the rear-left and rear-right wheels are calculated on the basis of the target frictional braking force Fbprt for the rear wheels.

In step 130, the braking pressures Pi applied to the front-left and front-right wheels and the rear-left and rear-right wheels are subjected to pressure-feedback control such that each of them becomes equal to a corresponding one of the target braking pressures Pbti. Subsequently the processing in step 10 is resumed.

A target regenerative braking force correction routine for the front and rear wheels in step 70 will now be described with reference to the flowcharts shown in FIGS. 3 and 4.

First of all in step 72, it is determined whether or not the target regenerative braking force Frgft for the front wheels is positive, namely, whether or not so-called regenerative cooperative control is being performed as to the front wheels. If the target regenerative braking force Frgft is not positive, it follows that regenerative control is being performed as to the front wheels. If the result of the determination in step 72 turns out to be negative, the processing in step 82 is performed. If the result of the determination in step 72 turns out to be positive, the processing in step 74 is performed.

In step 74, it is determined whether or not ABS control is being performed as to the front-left wheel or the front-right wheel. If the result of the determination in step 74 turns out to be positive, the processing in step 82 is performed. If the result of the determination in step 74 turns out to be negative, the processing in step 76 is performed.

In step 76, it is determined whether or not the braking slip amount SLfl for the front-left wheel or the braking slip amount SLfr for the front-right wheel is greater than the reference value SLb, namely, whether or not ABS control is highly likely to be started as to the front-left wheel or the front-right wheel. If the result of the determination in step 76 turns out to be negative, the processing in step 76A is performed. If the result of the determination in step 76 turns out to be positive, namely, if ABS control is highly likely to be started, the processing in step 78 is performed.

In steps 76A to 76C, determinations are made as to conditions on which ABS control is likely to be started.

In step 76A, it is determined whether or not the driver has performed an abrupt braking operation. If the result of the determination in step 76A turns out to be positive, the processing in step 78 is performed. If the result of the determination in step 76A turns out to be negative, the processing in step 76B is performed. It is appropriate that the processing of determining whether or not the driver has performed the abrupt braking operation be performed, for example, by determining whether or not the master cylinder pressure Pm or the depression stroke Sp or the final target deceleration Gt is equal to a criterion value or more and whether or not its increasing rate is equal to or higher than a criterion value.

In step 76B, it is determined whether or not the driver has performed a braking operation when the vehicle runs at a high deceleration. If the result of the determination in step 76B turns out to be positive, the processing in step 78 is performed. If the result of the determination in step 76B turns out to be negative, the processing in step 76C is performed. It is appropriate that the processing of determining whether or not the driver has performed the braking operation when the vehicle runs at a high deceleration be performed, for example, by determining whether or not the longitudinal acceleration or deceleration of the vehicle is equal to or higher than a criterion value and whether or not the master cylinder pressure Pm, the depression stroke Sp or the final target deceleration Gt is equal to a criterion value or more. It is to be noted herein that the longitudinal acceleration of the vehicle is detected by a longitudinal acceleration sensor (not shown) and that a longitudinal deceleration of the vehicle is estimated on the basis of rates of change in the wheel speeds Vwfl to Vwrr.

In step 76C, it is determined whether or not the vehicle runs at a high lateral acceleration. If the result of the determination in step 76C turns out to be positive, the processing in step 78 is performed. If the result of the determination in step 76C turns out to be negative, the processing in step 84 is performed. It is appropriate that the processing of determining whether or not the lateral acceleration of the vehicle is high be performed, for example, by determining whether or not the absolute value of a lateral acceleration of the vehicle detected by a lateral acceleration sensor (not shown) or the absolute value of a lateral acceleration of the vehicle estimated from a vehicle speed and a steering angle is equal to or greater than a criterion value.

If all the results in steps 76A to 76C turn out to be negative, it is determined that ABS control is not likely to be started.

In step 78, on the assumption that Frgftf represents the last value of a target regenerative braking force for the front wheels and that ΔFrg represents a positive constant, the target regenerative braking force Frgft for the front wheels is corrected through subtraction of ΔFrg. In step 80, it is determined whether or not the post-correction target regenerative braking force Frgft for the front wheels is smaller than a reference value Frgo (a very small positive constant). If the result of the determination in step 80 turns out to be negative, namely, if the target regenerative braking force Frgft is not smaller than the reference value Frgo, the processing in step 84 is performed to cancel the regenerative braking force applied to the front wheels. If the result of the determination in step 80 turns out to be positive, the target regenerative braking force Frgft for the front wheels is set as 0 in step 82. Thereafter the processing in step 84 is performed.

In step 84, it is determined whether or not the target regenerative braking force Frgrt for the rear wheels is positive, namely, whether or not so-called regenerative cooperative control is being performed to the rear wheels. If the result of the determination in step 84 turns out to be negative, the processing in step 96 is performed. If the result of the determination in step 84 turns out to be positive, the processing in step 86 is performed.

In step 86, it is determined whether or not ABS control is being performed as to the rear-left wheel or the rear-right wheel. If the result of the determination in step 86 turns out to be positive, the processing in step 96 is performed. If the result of the determination in step 86 turns out to be negative, the processing in step 88 is performed.

In step 88, it is determined whether or not any one of the braking slip amount SLfl of the front-left wheel, the braking slip amount SLfr of the front-right wheel, the braking slip amount SLrl of the rear-left wheel, and the braking slip amount SLrr of the rear-right wheel is greater than the reference value SLb, namely, whether or not ABS control is likely to be started as to any one of the wheels. If the result of the determination in step 88 turns out to be negative, the processing in step 88A is performed. If the result of the determination in step 88 turns out to be positive, the processing in step 92 is performed.

The processings in steps 88A to 88C are performed substantially in the same manner as the aforementioned processings in steps 76A to 76C. If the result of the determination in step 88C turns out to be positive, the processing in step 92 is performed. If the result of the determination in step 88C turns out to be negative, the processing in step 90 is performed.

In step 90, it is determined whether or not ABS control is being performed as to the front-left wheel or the front-right wheel. If the result of the determination in step 90 turns out to be negative, the processing in step 98 is performed. If the result of the determination in step 90 turns out to be positive, the processing in step 92 is performed.

In step 92, on the assumption that Frgrtf is the last value of the target regenerative braking force for the rear wheels, the target regenerative braking force Frgrt for the rear wheels is corrected through subtraction of ΔFrg. In step 94, it is determined whether or not the post-correction target regenerative braking force Frgrt for the rear wheels is smaller than the reference value Frgo. If the result of the determination in step 94 turns out to be negative, the processing in step 98 is performed. If the result of the determination in step 94 turns out to be positive, the target regenerative braking force Frgrt for the rear wheels is set as 0 in step 96. Thereafter the processing in step 98 is performed.

In step 98, a signal indicating the target regenerative braking force Frgft for the front wheels and a signal indicating the target regenerative braking force Frgrt for the rear wheels are output to the engine control device 28. Thereafter the processing proceeds to step 100.

Figure 5:
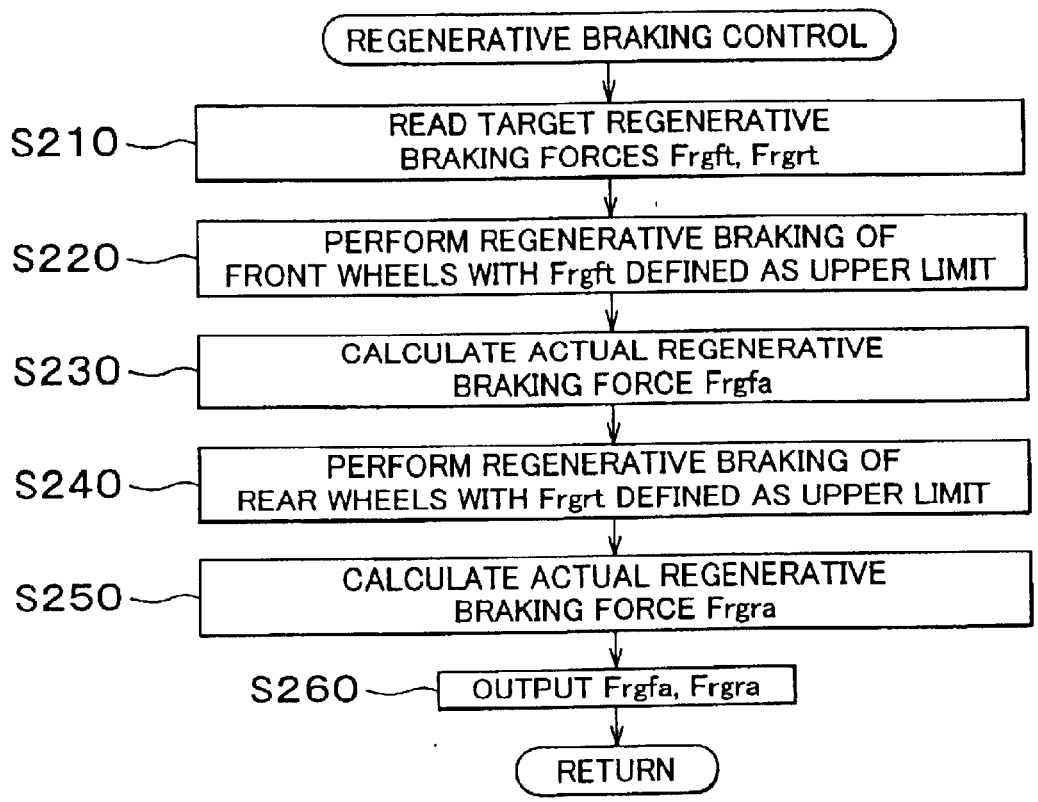
FIG. 5 is a flowchart showing a regenerative braking force control routine executed by an engine control device according to the exemplary embodiment shown in the drawings.

A regenerative braking control routine executed by the engine control device 28 according to the exemplary embodiment shown in the drawings will now be described with reference to the flowchart shown in FIG. 5. It is to be noted herein that control based on the flowchart shown in FIG. 5 is also started by closing the ignition switch (not shown) and is performed repeatedly at intervals of a predetermined period.

First of all in step 210, the braking control device 52 reads signals indicating the target regenerative braking force Frgft for the front wheels and the target regenerative braking force Frgrt for the rear wheels. In step 220, the regenerative braking device 30 for the front wheels performs regenerative braking with the target regenerative braking force Frgft defined as an upper limit. In step 230, the actual regenerative braking force Frgfa applied to the front wheels by the regenerative braking device 30 for the front wheels is calculated.

Similarly, in step 240, the regenerative braking device 40 for the rear wheels performs regenerative braking with the target regenerative braking force Frgrt defined as an upper limit. In step 250, the actual regenerative braking force Frgra applied to the rear wheels by the regenerative braking device 40 for the rear wheels is calculated. In step 260, signals indicating the actual regenerative braking force Frgfa applied to the front wheels and the actual regenerative braking force Frgra applied to the rear wheels are output to the braking control device 52. Thereafter the processing in step 210 is resumed.

Thus, according to the exemplary embodiment shown in the drawings, the target deceleration Gst based on the depression stroke Sp of the brake pedal 32 is calculated in step 20, and the target deceleration Gpt based on the master cylinder pressure Pm is calculated in step 30. In step 40, the weight α for the target deceleration Gpt is calculated on the basis of the final target deceleration Gt calculated during the last cycle, and the final target deceleration Gt is calculated as a weighted sum of the target deceleration Gpt and the target deceleration Gst.

In step 50, the target braking force Fbft for the front wheels and the target braking force Fbrt for the rear wheels are calculated on the basis of the final target deceleration Gt and the predetermined braking force distribution ratios for the front and rear wheels, respectively. In step 60, the target regenerative braking force Frgft for the front wheels is calculated as the smaller one of the target braking force Fbft and the maximum regenerative braking force Frgfmax. Further, in step 60, the target regenerative braking force Frgrt for the rear wheels is calculated as the smaller one of the target braking force Fbrt and the maximum regenerative braking force Frgrmax. In step 70, the target regenerative braking force Frgft for the front wheels and the target regenerative braking force Frgrt for the rear wheels are corrected depending on braking slip states of the wheels, and signals indicating these target regenerative braking forces are output to the engine control device 28.

Especially according to the exemplary embodiment shown in the drawings, if ABS control is being performed as to at least one of the front-left and front-right wheels, the target regenerative braking force Frgft for the front wheels is set as 0 (steps 74, 82). If ABS control is being performed as to at least one of the rear-left and rear-right wheels, the target regenerative braking force Frgrt for the rear wheels is set as 0 (steps 86, 96).

If the braking slip amount SLfl of the front-left wheel or the braking slip amount SLfr of the front-right wheel is greater than the reference value SLb, namely, if ABS control is likely to be started to the front-left wheel or the front-right wheel, the target regenerative braking force Frgft for the front wheels is gradually reduced (steps 76 and 78 to 82). If the braking slip amount SLi of any one of the wheels is greater than the reference value SLb, or if ABS control is being performed to at least one of the front-left and front-right wheels, namely, if ABS control is likely to be started as to the rear-left wheel or the rear-right wheel, the target regenerative braking force Frgrt for the rear wheels is gradually reduced (steps 88 and 92 to 96).

Also, if the driver has performed an abrupt braking operation, if the driver has performed a braking operation when the vehicle runs at a high deceleration, or if the vehicle runs at a high lateral speed, ABS control is likely to be started. Accordingly, the results of the determinations in steps 76A to 76C and 88A to 88C turn out to be positive, whereby the target regenerative braking force Frgft for the front wheels and the target regenerative braking force Frgrt for the rear wheels are gradually reduced (steps 78 to 82, 92 to 96).

In step 220 of the regenerative braking routine shown in FIG. 5, the engine control device 28 controls the motor generator 14 of the regenerative braking device 30 for the front wheels with the target regenerative braking force Frgft for the front wheels defined as an upper limit. In step 230, the actual regenerative braking force Frgfa generated by the regenerative braking device 30 for the front wheels is calculated on the basis of a voltage and a current generated by the motor generator 14. Further, in step 240, the engine control device 28 controls the motor generator 42 of the regenerative braking device 40 for the rear wheels with the target regenerative braking force Frgrt defined as an upper limit. In step 250, the actual regenerative braking force Frgra generated by the regenerative braking device 40 for the rear wheels is calculated on the basis of a voltage and a current generated by the motor generator 42.

Furthermore, in step 110, the target frictional braking force Fbpft for the front wheels is calculated as a value obtained by subtracting the actual regenerative braking force Frgfa from the target braking force Fbft. Further, in step 110, the target frictional braking force Fbprt for the rear wheels is calculated as a value obtained by subtracting the actual regenerative braking force Frgra from the target braking force Fbrt. In step 120, the target braking pressures Pbtfl, Pbtfr for the front-left and front-right wheels are calculated on the basis of the target frictional braking force Fbpft for the front wheels. In step 120, the target braking pressures Pbtrl, Pbtrr for the rear-left and rear-right wheels are calculated on the basis of the target frictional braking force Fbprt. In step 130, the braking pressures Pi for the front-left and front-right wheels and the rear-left and rear-right wheels are subjected to feedback control such that each of them becomes equal to a corresponding one of the target braking pressures Pbti.

Thus, according to the exemplary embodiment shown in the drawings, if ABS control is being performed as to at least either the left wheels or the right wheels, a corresponding one of the target regenerative braking forces is set as 0. Accordingly, ABS control is performed suitably without being adversely affected by regenerative braking. In addition, in the case where the driver has performed an abrupt braking operation, where the driver has performed a braking operation when the vehicle runs at a high deceleration, or where the vehicle runs at a high lateral speed, if it is determined that ABS control is likely to be started, the target regenerative braking force for the front or rear wheels and the target frictional braking force for the front or rear wheels are gradually reduced and increased respectively prior to the start of ABS control. Accordingly, the target regenerative braking force is reliably prevented from abruptly decreasing to 0 when ABS control is started in each of the aforementioned situations, and the deceleration of the vehicle is reliably prevented from abruptly changing due to an abrupt decrease in the target regenerative braking force.

Even in the case where the driver has performed an abrupt braking operation, where the driver has performed a braking operation when the vehicle runs at a high deceleration, or where the vehicle runs at a high lateral speed, ABS control is not started actually in some cases. However, in such cases, although the regeneration efficiency decreases temporarily, the deceleration of the vehicle does not become insufficient for a deceleration required by the driver.

Especially according to the exemplary embodiment shown in the drawings, if ABS control is likely to be started as to the front-left wheel or the front-right wheel, the target regenerative braking force Frgft for the front wheels is gradually reduced prior to the start of ABS control. Further, if the target frictional braking force Fbpft for the front wheels is gradually increased so that ABS control is likely to be started as to the rear-left wheel or the rear-right wheel, the target regenerative braking force Frgrt for the rear wheels is reduced prior to the start of ABS control. Furthermore, the target frictional braking force Fbprt for the rear wheels is gradually increased. Therefore, the target regenerative braking force is reliably prevented from abruptly decreasing to 0 when ABS control is started, and the deceleration of the vehicle is reliably prevented from abruptly changing due to an abrupt decrease in the target regenerative braking force.

Further, according to the exemplary embodiment shown in the drawings, the final target deceleration Gt as a braking amount required by the driver is calculated on the basis of the pedal stroke Sp and the master cylinder pressure Pm. Further, the braking force applied to the entire vehicle, namely, the sum of the braking forces applied to the front and rear wheels by the frictional braking device and the braking forces applied to the front and rear wheels by the regenerative braking device, is controlled in such a manner as to become equal to a value corresponding to the final target deceleration Gt. Accordingly, it is possible to reliably control the braking force applied to the entire vehicle in accordance with the braking amount required by the driver. Moreover, a decrease in each of the regenerative braking forces resulting from a gradual decrease in a corresponding one of the target regenerative braking forces prior to the start of ABS control is supplemented with a frictional braking force. Accordingly, the deceleration of the vehicle is more reliably prevented from abruptly changing when ABS control is started, as compared to the case where such a decrease is not supplemented with a frictional braking force.

Figure 10:
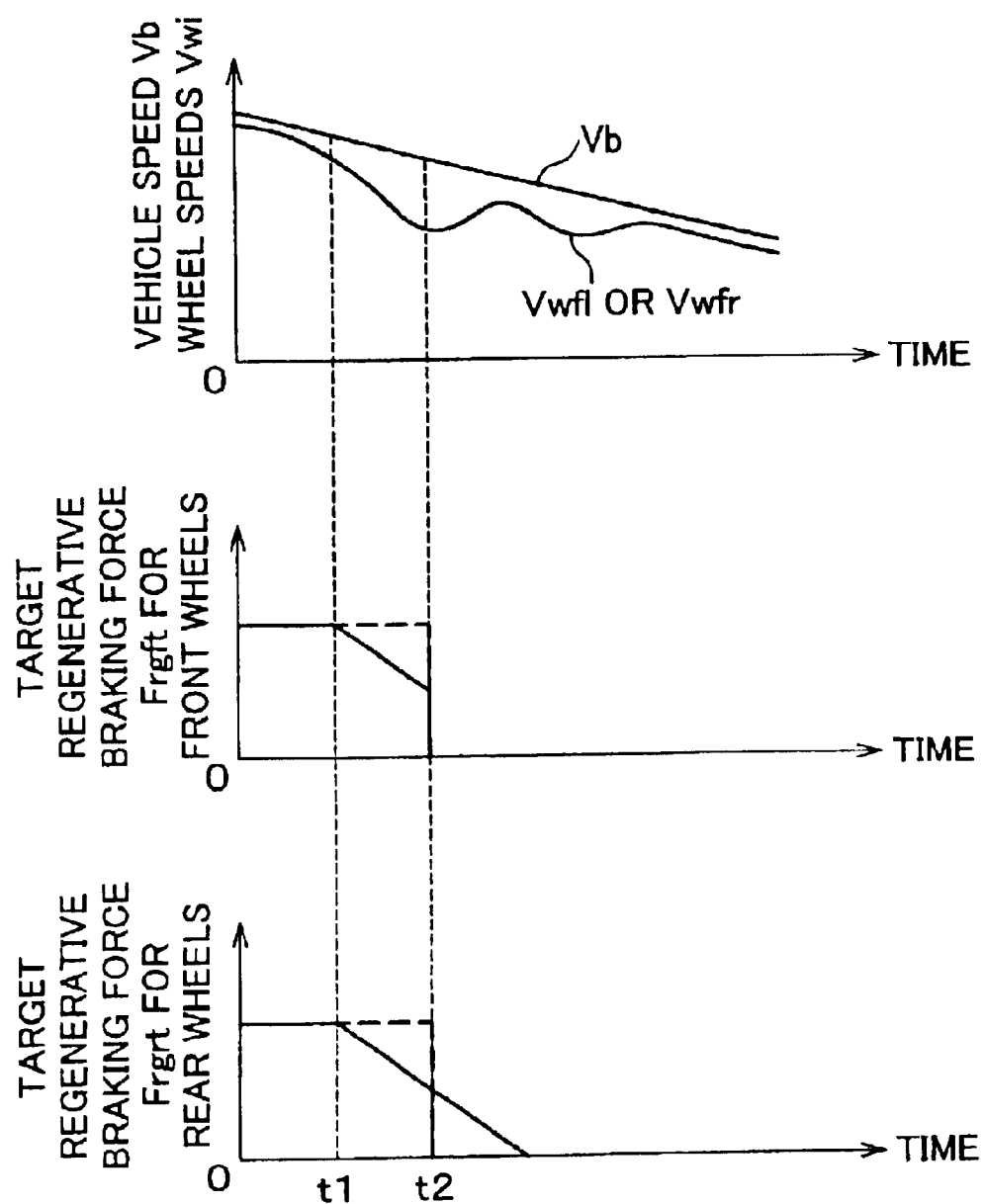
FIG. 10 is a graph showing vehicle and wheel speeds versus time and operation of the exemplary embodiment shown in the drawings in the case where anti-skid control is performed as to the front wheels in response to a gradual increase in braking slip amount of the front wheels.

For instance, FIG. 10 illustrates operation of the exemplary embodiment shown in the drawings in the case where the braking slip amount of the front wheels is gradually increased so that ABS control is performed as to the front wheels.

In FIG. 10, it is assumed that the slip amount SLf (SLfl or SLfr) of the front wheels becomes greater than the reference value SLb at a time t1, that a condition for starting ABS control is fulfilled at a time t2, and that ABS control is started as to the front wheels in response to fulfillment of the condition. In this case, the target regenerative braking force for the front wheels is not set as 0 at the time t2 as indicated by a broken line, but is gradually reduced from the time t1 as indicated by a solid line. The target regenerative braking force Frgft for the front wheels is set as 0 at the time t2. Accordingly, the amount of a decrease in the target regenerative braking force Frgft for the front wheels is reduced at the time t2.

In general, if ABS control is started as to the front wheels, it is often started thereafter as to the rear wheels as well. However, according to the exemplary embodiment shown in the drawings, the target regenerative braking force Frgrt for the rear wheels is gradually reduced as well from the time 1. Therefore, when ABS control is started as to the rear wheels, the target regenerative braking force Frgrt for the rear wheels has already reached a very small value or 0. Accordingly, the target regenerative braking forces are also reliably prevented from abruptly decreasing when ABS control is started as to the rear wheels.

Figure 11:
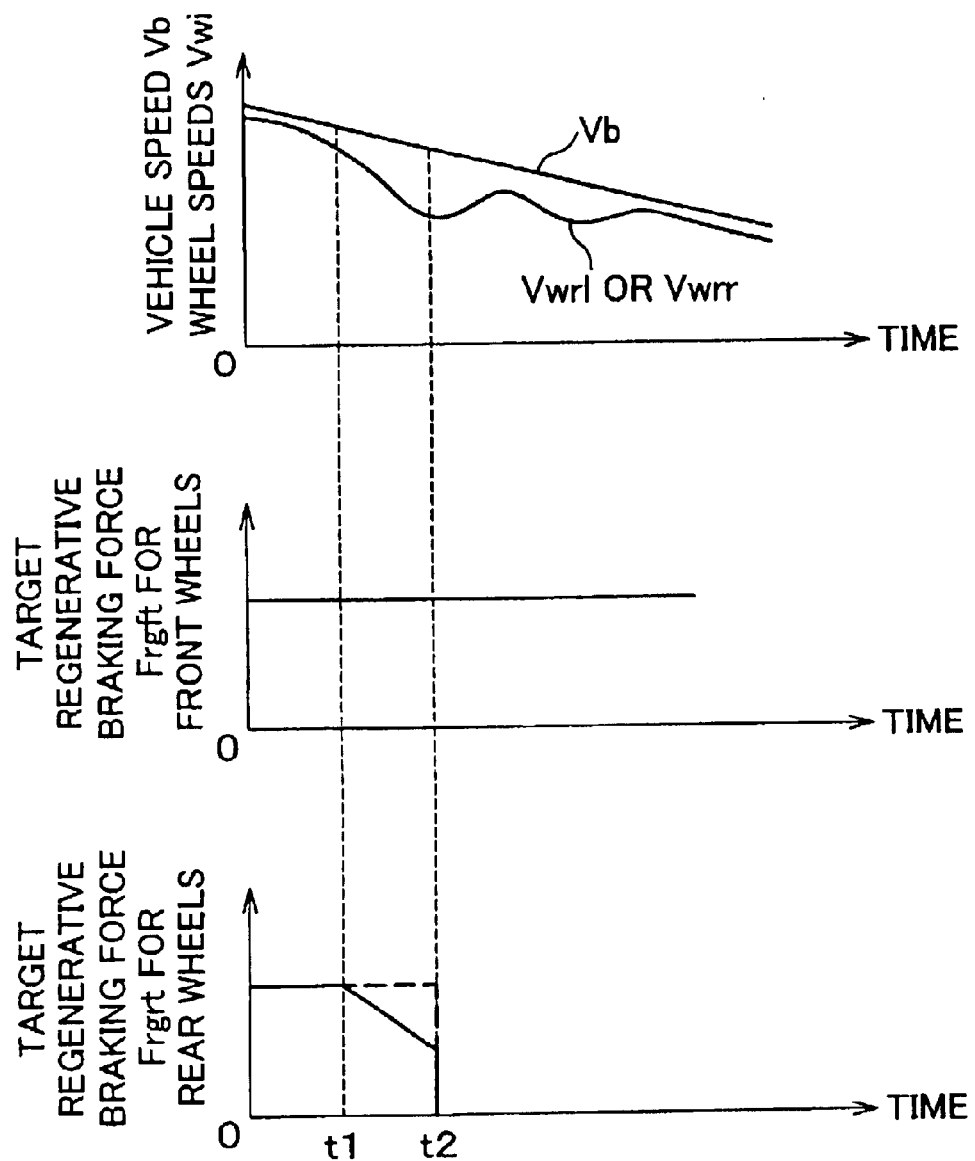
FIG. 11 is a graph showing vehicle and wheel speeds versus time and operation of the exemplary embodiment shown in the drawings in the case where anti-skid control is performed as to the rear wheels in response to a gradual increase in braking slip amount of the rear wheels.

FIG. 11 illustrates operation of the exemplary embodiment shown in the drawings in the case where the braking slip amount of the rear wheels is gradually increased so that ABS control is performed as to the rear wheels.

In FIG. 11, as in the case of FIG. 10, the slip amount SLr (Slrl or SLrr) of the rear wheels becomes greater than the reference value SLb at the time t1 and it is assumed that ABS control is started as to the rear wheels at the time t2 in response to fulfillment of a condition for starting ABS control. In this case, the target regenerative braking force Frgrt for the rear wheels is not set as 0 at the time t2 as indicated by a broken line, but is gradually reduced from the time t1 as indicated by a solid line. The target regenerative braking force Frgrt for the rear wheels is set as 0 at the time t2. Therefore, the amount of a decrease in the target regenerative braking force Frgrt for the rear wheels at the time t2 can be reduced.

In general, the possibility of ABS control being started as to the front wheels as well after the start of ABS control as to the rear wheels is lower than the possibility of ABS control being started as to the rear wheels as well after the start of ABS control as to the front wheels. The possibility of a deterioration in vehicle behavior in the circumstances where ABS control is started as to the rear wheels is lower than the possibility of a deterioration in vehicle behavior in the circumstances where ABS control is started as to the front wheels.

In the exemplary embodiment shown in the drawings, even if the slip amount SLr of the rear wheels has become greater than the reference value SLb, regenerative braking of the front wheels is further continued without gradually reducing the target regenerative braking force Frgft for the front wheels. Accordingly, even if the slip amount SLr of the rear wheels has become greater than the reference value SLb, the regeneration efficiency of the entire vehicle can be enhanced as compared to the case where the target regenerative braking force Frgft for the front wheels is gradually reduced.

According to the exemplary embodiment shown in the drawings, the ratio between the sum of the braking forces applied to the front or rear wheels by the frictional braking device and the braking forces applied to the front or rear wheels by the regenerative braking device on one hand, and the sum of the braking forces applied to the rear wheels by the frictional braking device and the braking forces applied to the rear wheels by the regenerative braking device on the other hand, is controlled in such a manner as to always become equal to a predetermined braking force distribution ratio Kf or Kr between the front wheels or the rear wheels. Accordingly, the ratio of distribution of the braking forces applied to the front or rear wheels can be reliably adjusted to the predetermined braking force distribution ratio between the front wheels or the rear wheels irrespective of the ratio between the braking forces generated by the frictional braking device and the braking forces generated by the regenerative braking device. Accordingly, a deterioration in vehicle stability or changes in steering characteristics can be reliably prevented from being caused as a result of the case where the braking force distribution ratio between the front wheels or the rear wheels becomes equal to a distribution ratio different from the predetermined distribution ratio.

Further, the regenerative braking forces applied to the front wheels and the frictional braking forces applied to the front wheels are controlled such that the braking forces applied to the front wheels by the regenerative braking device are maximized, whereby the target braking force Fbft for the front wheels is realized. Also, the regenerative braking forces applied to the rear wheels and the frictional braking forces applied to the rear wheels are controlled such that the braking forces applied to the rear wheels by the regenerative braking device are maximized, whereby the target braking force Fbrt for the rear wheels is realized. Accordingly, while the predetermined braking force distribution ratio between the front wheels or the rear wheels is realized, the regenerative braking forces and the frictional braking forces are controlled such that the regeneration efficiency of the entire vehicle is maximized.

In general, various restrictions are imposed on a regenerative braking device, particularly on a regenerative braking device employing a motor generator built into a hybrid vehicle. Therefore, even if the regenerative braking device is controlled at a certain target regenerative braking force, the actual regenerative braking force does not become equal to the target regenerative braking force. The actual regenerative braking force is lower than the target regenerative braking force.

According to the exemplary embodiment shown in the drawings, with the target regenerative braking force Frgft for the front wheels and the target regenerative braking force Frgrt for the rear wheels defined as upper limits, the engine control device 28 controls the motor generator 14 of the regenerative braking device 30 for the front wheels and the motor generator 42 of the regenerative braking device 40 for the rear wheels. Each of the actual regenerative braking forces Frgfa, Frgfa applied to the front and rear wheels is calculated on the basis of a voltage and a current generated by a corresponding one of the motor generators. The target frictional braking force Fbpft for the front wheels and the target frictional braking force Fbprt for the rear wheels are calculated by subtracting the actual regenerative braking forces Frgfa, Frgra from the target braking forces Fbft, Fbrt respectively. Accordingly, the frictional braking forces applied to the front and rear wheels are controlled such that the braking force applied to the entire vehicle corresponds to a braking amount required by the driver, as compared to the case where the target frictional braking force Fbpft for the front wheels and the target frictional braking force Fbprt for the rear wheels are calculated by subtracting the target regenerative braking forces Frgft, Frgrt from the target braking forces Fbft, Fbrt respectively.

In one preferred aspect of at least one exemplary embodiment of the invention, the braking force control apparatus is designed as follows. That is, the vehicle has the regenerative braking device and the frictional braking device for the front wheels and the regenerative braking device and the frictional braking device for the rear wheels. If it is determined that anti-skid control is likely to be started to at least one of the front-left and front-right wheels, the braking force control apparatus gradually reduces the regenerative braking forces applied to the front wheels and gradually increases the frictional braking forces applied to the front wheels. If anti-skid control is started to at least one of the front-left and front-right wheels, the braking force control apparatus stops regenerative braking of the front wheels. If it is determined that anti-skid control is likely to be started to at least one of the rear-left and rear-right wheels, the braking force control apparatus gradually reduces the regenerative braking forces applied to the rear wheels and gradually increases the frictional braking forces applied to the rear wheels. If anti-skid control is started to at least one of the rear-left and rear-right wheels, the braking force control apparatus stops regenerative braking of the rear wheels.

In another preferred aspect of at least one exemplary embodiment of the invention, the braking force control apparatus is designed as follows. That is, if it is determined that anti-skid control is likely to be started to at least one of the front-left and front-right wheels, the braking force control apparatus gradually reduces the regenerative braking forces applied to the rear wheels as well as to the front wheels and gradually increases the frictional braking forces applied to the rear wheels as well as to the front wheels.

In another preferred aspect of at least one exemplary embodiment of the invention, the braking force control apparatus is designed as follows. That is, if anti-skid control is being performed to at least one of the front-left and front-right wheels, the braking force control apparatus gradually reduces the regenerative braking forces applied to the rear wheels and gradually increases the frictional braking forces applied to the rear wheels.

In another preferred aspect of at least one exemplary embodiment of the invention, the braking force control apparatus is designed as follows. That is, if it is determined that anti-skid control is likely to be started to at least one of the rear-left and rear-right wheels, or if anti-skid control is being performed to at least one of the rear-left and rear-right wheels, then the braking control apparatus does not gradually reduce the regenerative braking forces applied to the front wheels and does not gradually increase the frictional braking forces applied to the front wheels.

In another preferred aspect of at least one exemplary embodiment of the invention, the braking force control apparatus is designed as follows. That is, the vehicle has the regenerative braking device and the frictional braking device for the front wheels and the regenerative braking device and the frictional braking device for the rear wheels. The braking force control apparatus calculates target braking forces for the front and rear wheels on the basis of a braking amount required by a driver and a corresponding one of predetermined braking force distribution ratios between the front wheels and between the rear wheels respectively, calculates a target regenerative braking force for the front wheels and a target frictional braking force for the front wheels on the basis of the target braking force for the front wheels such that the sum of the target regenerative braking force for the front wheels and the target frictional braking force for the front wheels becomes equal to the target braking force for the front wheels, adjusts braking forces applied to the front wheels to the target braking force for the front wheels by controlling the regenerative braking device for the front wheels and the frictional braking device for the front wheels on the basis of the target regenerative braking force for the front wheels and the target frictional braking force for the front wheels, calculates a target regenerative braking force for the rear wheels and a target frictional braking force for the rear wheels on the basis of a target braking force for the rear wheels such that the sum of the target regenerative braking force for the rear wheels and the target frictional braking force for the rear wheels becomes equal to the target braking force for the rear wheels, and adjusts braking forces applied to the rear wheels to the target braking force for the rear wheels by controlling the regenerative braking device for the rear wheels and the frictional braking device for the rear wheels on the basis of the target regenerative braking force for the rear wheels and the target frictional braking force for the rear wheels. By gradually reducing the regenerative braking forces applied to the front wheels and gradually increasing the frictional braking forces applied to the front wheels, the braking force control apparatus gradually reduces the target regenerative braking force for the front wheels and gradually increases the target frictional braking force for the front wheels, respectively. By gradually reducing the regenerative braking forces applied to the rear wheels and gradually increasing the frictional braking forces applied to the rear wheels, the braking force control apparatus gradually reduces the target regenerative braking force for the rear wheels and gradually increases the target frictional braking force for the rear wheels, respectively.

In another preferred aspect of at least one exemplary embodiment of the invention, the braking force control apparatus is designed as follows. That is, the braking force control apparatus adjusts braking forces applied to the front wheels and braking forces applied to the rear wheels to the target braking force for the front wheels and the target braking force for the rear wheels, respectively, by generating braking forces with higher priority assigned to the regenerative braking device than to the frictional braking device as to both the front wheels and the rear wheels.

In another preferred aspect of at least one exemplary embodiment of the invention, the braking force control apparatus is designed as follows. That is, the braking force control apparatus calculates a target braking force Fbft for the front wheels and a target braking force Fbrt for the rear wheels on the basis of a braking amount required by the driver and predetermined braking force distribution ratios between the front wheels and between the rear wheels, respectively, with a maximum regenerative braking force generated by the regenerative braking device for the front wheels and a maximum regenerative braking force generated by the regenerative braking device for the rear wheels defined as Frgfmax and Frgrmax respectively, controls the regenerative braking device for the front wheels while the smaller one of the target braking force Fbft and the maximum regenerative braking force Frgfmax defined as the target regenerative braking force Frgft, controls the regenerative braking device for the rear wheels with the smaller one of the target braking force Fbrt and the maximum regenerative braking force Frgrmax defined as the target regenerative braking force Frgrt, calculates actual regenerative braking forces Frgfa, Frgra generated by the regenerative braking device for the front wheels and the regenerative braking device for the rear wheels respectively, and controls the frictional braking device for the front wheels and the frictional braking device for the rear wheels with (Fbft−Frgfa) and (Fbrt−Frgra) defined as the target frictional braking force for the front wheels and the target frictional braking force for the rear wheels respectively.

In another preferred aspect of at least one exemplary embodiment of the invention, the braking force control apparatus is designed as follows. That is, the braking force control has a control device for the regenerative braking devices and a control device for the frictional braking devices. These control devices transmit information to each other. The control device for the frictional braking devices calculates a target braking force Fbft for the front wheels and a target braking force for the rear wheels on the basis of a braking amount required by the driver and predetermined braking force distribution ratios between the front wheels and between the rear wheels respectively, and controls the frictional braking device for the front wheels and the frictional braking device for the rear wheels with (Fbft-Frgfa) and (Fbrt-Frgra) defined as a target frictional braking force for the front wheels and a target frictional braking force for the rear wheels respectively. The control device for the regenerative braking devices controls the regenerative braking device for the front wheels with the smaller one of the target braking force Fbft and the maximum regenerative braking force Frgfmax defined as the target regenerative braking force Frgft, controls the regenerative braking device for the rear wheels with the smaller one of the target braking force Fbrt and the maximum regenerative braking force Frgrmax defined as the target regenerative braking force Frgrt, and calculates an actual regenerative braking force Frgfa generated by the regenerative braking device for the front wheels and an actual regenerative braking force Frgra generated by the regenerative braking device for the rear wheels.

In another preferred aspect of at least one exemplary embodiment of the invention, the braking force control apparatus is designed as follows. That is, at least one of the regenerative braking device for the front wheels and the regenerative braking device for the rear wheels includes a motor generator that cooperates with an internal combustion engine constituting part of a hybrid engine.

In another preferred aspect of at least one exemplary embodiment of the invention, the braking force control apparatus is designed as follows. That is, at least one of the regenerative braking device for the front wheels and the regenerative braking device for the rear wheels includes a motor generator that cooperates with an internal combustion engine constituting part of a hybrid engine. The control device for the regenerative braking device, which controls the at least one of the regenerative braking devices, is a hybrid-engine control device.

Although the invention has been described in detail as to an exemplary embodiment and preferred aspects thereof, it would be obvious to those skilled in the art that the invention is not limited to the aforementioned exemplary embodiment and preferred aspects thereof, and that other various exemplary embodiments are possible within the scope of the invention.

For instance, according to the aforementioned embodiment, the braking control apparatus is a braking force control apparatus of a hydraulic type in which a braking force is increased or reduced through an increase or decrease of pressure in each wheel cylinder. However, it is also appropriate that the invention be applied to a braking force control apparatus of an electrical type having an electrical pressing device, such as a motor, for pressing a frictional member, such as a brake pad, against a rotational member, such as a brake rotor, disposed in each wheel.

Further, according to the aforementioned exemplary embodiment, if a correction for reducing the target regenerative braking forces is terminated or canceled due to termination of ABS control or the like, the values calculated in step 60 are adopted again. Accordingly, the regeneration efficiency of the entire vehicle can be enhanced as compared with the case where the target regenerative braking forces are gradually increased. However, the aforementioned exemplary embodiment may be modified such that the target regenerative braking forces are gradually increased. The target regenerative braking forces are thereby reliably prevented from changing abruptly at the time of termination of ABS control or the like, and deceleration of the vehicle is also reliably prevented from changing abruptly as a result of such abrupt changes in the target regenerative braking forces.

Further, according to the aforementioned exemplary embodiment, if the slip amount of a certain one of the wheels has become greater than the reference value, if the driver has performed an abrupt braking operation, if the driver has performed a braking operation when the vehicle runs at a high deceleration, or if the vehicle runs at high lateral speed, it is determined that ABS control is likely to be started. Therefore, it is appropriate that any one of the steps 76 to 76C in FIG. 3 or any one of the steps 88 to 88C in FIG. 4 be omitted.

Further, according to the aforementioned exemplary embodiment, a determination as to a braking slip degree is made on the basis of the braking slip amount SLi. However, the aforementioned exemplary embodiment may be modified such that a determination as to a braking slip degree is made on the basis of a braking slip rate.

Further, according to the aforementioned exemplary embodiment, the engine control device 28 as the control device for the regenerative braking devices and the braking control device 52 as the control device for the frictional braking devices transmit information on the target regenerative braking forces and the actual regenerative braking forces to each other. However, the aforementioned exemplary embodiment may be modified as follows. That is, a target regenerative braking torque is calculated on the basis of each of the target regenerative braking forces, and a signal indicating the target regenerative braking torque is transmitted from the braking control device 52 to the engine control device 28, which controls regenerative braking with the target regenerative braking torque defined as an upper limit. Then, on the contrary, a signal indicating an actual regenerative braking torque is transmitted from the engine control device 28 to the braking control device 52, and an actual regenerative braking force is calculated on the basis of the actual regenerative braking torque.

Further, according to the aforementioned exemplary embodiment, the target deceleration Gt of the vehicle is calculated on the basis of the depression stroke Sp of the brake pedal 32 and the master cylinder Pm, and the target braking force Fbft for the front wheels and the target braking force Fbrt for the rear wheels are calculated on the basis of the target deceleration. However, it is also appropriate that the target braking force Fbft for the front wheels and the target braking force Fbrt for the rear wheels be calculated on the basis of the depression stroke Sp or the master cylinder pressure Pm.

Figure 9:
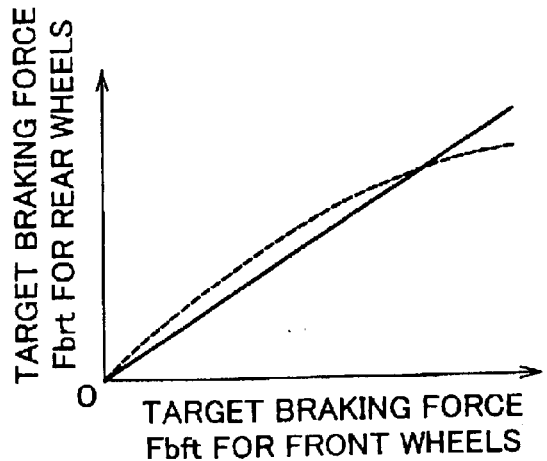
FIG. 9 is a graph showing a relation between target braking force Fbft for the front wheels and target braking force Fbrt for the rear wheels.

Further, according to the aforementioned exemplary embodiment, the braking force distribution ratio Kf or Kr between the front wheels or the rear wheels is constant regardless of whether a corresponding one of the target braking forces is great or small. However, as indicated by a broken line in FIG. 9 as an example, the aforementioned exemplary embodiment may be modified such that the ratio of the braking forces distributed to the rear wheels to the braking forces distributed to the front wheels becomes smaller as the target braking forces increase.

Further, according to the aforementioned exemplary embodiment, the drive means for driving the vehicle is the hybrid engine 10 including the gasoline engine 12 and the motor generator 14, which operates as a generator for regenerative braking. However, it is also appropriate that the internal combustion engine of the hybrid engine 10 be an internal combustion engine of a different type such as a diesel engine, that the drive means for driving the vehicle be an ordinary internal combustion engine, and that the generator for regenerative braking be independent from the internal combustion engine.

Further, according to the aforementioned exemplary embodiment, the front-wheel drive vehicle is employed. However, it is also appropriate that the vehicle to which the invention is applied be a rear-wheel drive vehicle or a four-wheel drive vehicle. Further, according to the aforementioned exemplary embodiment, the motor generator 40 for the rear wheels operates exclusively as a generator for regenerative braking. However, the aforementioned exemplary embodiment may be modified such that the motor generator 40 for the rear wheels functions, for example, as an auxiliary drive source for driving the rear wheels in case of necessity.

In the illustrated embodiment, the apparatus is controlled by the controller (e.g., the control devices 28, 52), which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A braking force control apparatus for a vehicle, comprising:
   a regenerative braking device that performs regenerative braking with a regenerative braking force;
   a frictional braking device that performs frictional braking with a frictional braking force; and
   a controller that detects an anti-skid control,
   wherein when the controller detects that the anti-skid control is likely to be started, the controller gradually reduces the regenerative braking force and gradually increases the frictional braking force, and when the anti-skid control is started, the controller stops the regenerative braking and supplements a braking force by the frictional braking device.

2. The braking force control apparatus according to claim 1, wherein
   it is determined that the anti-skid control is likely to be started when an abrupt braking operation is performed.

3. The braking force control apparatus according to claim 2, wherein
   the controller stops regenerative braking affront wheels of the vehicle if anti-skid control is performed to at least one of a front-left wheel and a front-right wheel of the vehicle.

4. The braking force control apparatus according to claim 3, wherein
   the controller gradually reduces regenerative braking forces applied to rear wheels of the vehicle and gradually increases frictional braking forces applied to the rear wheels if anti-skid control is performed to at least one of the front-left wheel and the front-right wheel of the vehicle.

5. The braking force control apparatus according to claim 2, wherein
   the controller gradually reduces regenerative braking forces applied to front wheels of the vehicle and gradually increases frictional braking forces applied to the front wheels if it is determined that anti-skid control is likely to be started to at least one of a front-left wheel and a front-right wheel of the vehicle.

6. The braking force control apparatus according to claim 5, wherein
   the controller gradually reduces regenerative braking forces applied to the rear wheels of the vehicle and gradually increases frictional braking forces applied to the rear wheels if it is determined that anti-skid control is likely to be started to at least one of the front-left wheel and the front-right wheel of the vehicle.

7. The braking force control apparatus according to claim 2, wherein
   the controller stops regenerative braking of rear wheels of the vehicle if anti-skid control is being performed to at least one of a rear-left wheel and a rear-right wheel of the vehicle.

8. The braking force control apparatus according to claim 7, wherein
   the controller prohibits gradually reducing regenerative braking forces applied to front wheels of the vehicle and prohibits gradually increasing frictional braking forces applied to the front wheels if anti-skid control is being performed to at least one of the rear-left wheel and the rear-right wheel of the vehicle.

9. The braking force control apparatus according to claim 2, wherein
   the controller gradually reduces regenerative braking forces applied to rear wheels of the vehicle and gradually increases frictional braking forces applied to the rear wheels if it is determined that anti-skid control is likely to be started to at least one of a rear-left wheel and a rear-right wheel of the vehicle.

10. The braking force control apparatus according to claim 9, wherein
    the controller prohibits gradually reducing regenerative braking forces applied to front wheels of the vehicle and prohibits gradually increasing frictional braking forces applied to the front wheels if it is determined that anti-skid control is likely to be started to at least one of the rear-left wheel and the rear-right wheel of the vehicle.

11. The braking force control apparatus according to claim 2, wherein
    the controller calculates a target braking force at least based on a required braking amount, calculates a target regenerative braking force and a target frictional braking force based on the target braking force such that the sum of the target regenerative braking force and the target frictional braking force becomes equal to the target braking force, adjusts the braking force to the target braking force by controlling the regenerative braking device and the frictional braking device based on the target regenerative braking force and the target frictional braking force respectively, gradually reduces a regenerative braking force by gradually reducing the target regenerative braking force, and gradually increases a frictional braking force by gradually increasing the target frictional braking force.

12. The braking force control apparatus according to claim 11, wherein
the controller calculates a target braking force for front wheels of the vehicle based on a required braking amount and a predetermined braking force distribution ratio between the front wheels and the rear wheels of the vehicle, calculates a target regenerative braking force for the front wheels and a target frictional braking force for the front wheels based on a target braking force for the front wheels such that the sum of the target regenerative braking force for the front wheels and the target frictional braking force for the front wheels becomes equal to the target braking force for the front wheels, and adjusts braking forces applied to the front wheels to the target braking force for the front wheels by controlling the regenerative braking device for the front wheels and the frictional braking device for the front wheels based on the target regenerative braking force for the front wheels and the target frictional braking force for the front wheels respectively.

13. The braking force control apparatus according to claim 12, wherein
the controller gradually reduces the target regenerative braking force for the front wheels when the regenerative braking forces applied to the front wheels are gradually reduced and gradually increases the target frictional braking force for the front wheels when the frictional braking forces applied to the front wheels are gradually increased.

14. The braking force control apparatus according to claim 11, wherein
the controller calculates a target braking force for the rear wheels based on a required braking amount and a predetermined braking force distribution ratio between the front wheels and the rear wheels, calculates a target regenerative braking force for the rear wheels and a target frictional braking force for the rear wheels based on a target braking force for the rear wheels such that the sum of the target regenerative braking force for the rear wheels and the target frictional braking force for the rear wheels becomes equal to the target braking force for the rear wheels, and adjusts braking forces applied to the rear wheels to the target braking force for the rear wheels by controlling the regenerative braking device for the rear wheels and the frictional braking device for the rear wheels based on the target regenerative braking force for the rear wheels and the target frictional braking force for the rear wheels respectively.

15. The braking force control apparatus according to claim 14, wherein
the controller gradually reduces the target regenerative braking force for the rear wheels when regenerative braking forces applied to the rear wheels are gradually reduced and gradually increases the target frictional braking force for the rear wheels when frictional braking forces applied to the rear wheels are gradually increased.

16. The braking force control apparatus according to claim 11, wherein
the controller adjusts braking forces applied to the front wheels and braking forces applied to the rear wheels to the target braking force for the front wheels and the target braking force for the rear wheels, respectively, by generating braking forces with a higher priority assigned to the regenerative braking device than to the frictional braking device as to both the front wheels and the rear wheels.

17. The braking force control apparatus according to claim 16, wherein
the controller calculates a target braking force for the front wheels based on a maximum regenerative braking force of the regenerative braking device for the front wheels, a required braking amount, and a predetermined braking force distribution ratio between the front wheels and the rear wheels, controls the regenerative braking device for the front wheels with the smaller one of the target braking force for the front wheels and the maximum regenerative braking force defined as a target regenerative braking force for the front wheels, calculates an actual regenerative braking force of the regenerative braking device for the front wheels, and controls the frictional braking device for the front wheels with a value obtained by subtracting the actual regenerative braking force from the target braking force defined as a target frictional braking force for the front wheels.

18. The braking force control apparatus according to claim 17, wherein:
the controller includes a regenerative-braking-device controller that controls the regenerative braking device and a frictional-braking-device controller that controls the frictional braking device,
the regenerative-braking-device controller and the frictional-braking-device controller transmit information to each other,
the frictional-braking-device controller calculates a target braking force for the front wheels based on a required braking amount and a predetermined braking force distribution ratio between the front wheels and the rear wheels and controls the frictional braking device for the front wheels with a value obtained by subtracting the actual regenerative braking force from the target regenerative braking force defined as a target frictional braking force for the front wheels, and
the regenerative-braking-device controller for the front wheels controls the regenerative braking device for the front wheels with the smaller one of the target braking force for the front wheels and the maximum regenerative braking force defined as a target regenerative braking force.

19. The braking force control apparatus according to claim 16, wherein
the controller calculates a target braking force for the rear wheels based on a maximum regenerative braking force of the regenerative braking device for the rear wheels, a required braking amount, and a predetermined braking force distribution ratio between the front wheels and the rear wheels, controls the regenerative braking device for the rear wheels with the smaller one of the target braking force for the rear wheels and the maximum regenerative braking force defined as a target regenerative braking force for the rear wheels, calculates an actual braking force of the regenerative braking device for the rear wheels, and controls the frictional braking device for the rear wheels with a value obtained by subtracting the actual regenerative braking force from the target braking force defined as a target frictional braking force for the rear wheels.

20. The braking force control apparatus according to claim 19, wherein:

the controller includes a regenerative-braking-device controller that controls the regenerative control device and a frictional-braking-device controller that controls the frictional control device, the regenerative-braking-device controller and the frictional-braking-device controller transmit information to each other, the frictional-braking-device controller calculates a target braking force for the rear wheels based on a required braking amount and a predetermined braking force distribution ratio between the front wheels and the rear wheels and controls the frictional braking device for the rear wheels with a value obtained by subtracting the actual regenerative braking force from the target regenerative braking force defined as a target frictional braking force for the rear wheels, and the regenerative-braking-device controller for the rear wheels controls the regenerative braking device for the rear wheels with the smaller one of the target braking force for the rear wheels and the maximum regenerative braking force defined as a target regenerative braking force.

21. The braking force control apparatus according to claim 16, wherein at least one of the regenerative braking device for the front wheels and the regenerative braking device for the rear wheels is designed to include a motor-generator that cooperates with an internal combustion engine in a hybrid engine.

22. The braking force control apparatus according to claim 21, wherein a regenerative-braking-device controller for controlling the at least one of the regenerative braking devices is designed as a hybrid-engine controller.

23. The braking force control apparatus according to claim 1, wherein it is determined that the anti-skid control is likely to be started when a breaking operation is performed and the vehicle runs at a high deceleration.

24. The braking force control apparatus according to claim 23, wherein the controller stops regenerative braking of a front wheels if anti-skid control is performed to at least one of a front-left wheel and a front-right wheel of the vehicle.

25. The braking force control apparatus according to claim 24, wherein the controller gradually reduces regenerative braking forces applied to rear wheels of the vehicle and gradually increases frictional braking forces applied to the rear wheels if anti-skid control is performed to at least one of the front-left wheel and the front-right wheel of the vehicle.

26. The braking force control apparatus according to claim 23, wherein the controller gradually reduces regenerative braking forces applied to front wheels and gradually increases frictional braking forces applied to the front wheels if it is determined that anti-skid control is likely to be started to at least one of a front-left wheel and a front-right wheel of the vehicle.

27. The braking force control apparatus according to claim 26, wherein the controller gradually reduces regenerative braking forces applied to the rear wheels of the vehicle and gradually increases frictional braking forces applied to the rear wheels if it is determined that anti-skid control is likely to be started to at least one of the front-left wheel and the front-right wheel of the vehicle.

28. The braking force control apparatus according to claim 23, wherein the controller stops regenerative braking of the rear wheels if anti-skid control is being performed to at least one of a rear-left wheel and a rear-right wheel of the vehicle.

29. The braking force control apparatus according to claim 28, wherein the controller prohibits gradually reducing regenerative braking forces applied to the front wheels and prohibits gradually increasing frictional braking forces applied to the front wheels if anti-skid control is performed to at least one of the rear-left wheel and the rear-right wheel of the vehicle.

30. The braking force control apparatus according to claim 23, wherein the controller gradually reduces regenerative braking forces applied to rear wheels of the vehicle and gradually increases frictional braking forces applied to the rear wheels if it is determined that anti-skid control is likely to be started to at least one of a rear-left wheel and a rear-right wheel of the vehicle.

31. The braking force control apparatus according to claim 30, wherein the controller prohibits gradually reducing regenerative braking forces applied to the front wheels and prohibits gradually increasing frictional braking forces applied to the front wheels if it is determined that anti-skid control is likely to be started to at least one of the rear-left wheel and the rear-right wheel of the vehicle.

32. The braking force control apparatus according to claim 23, wherein the controller calculates a target braking force at least based on a required braking amount, calculates a target regenerative braking force and a target frictional braking force based on the target braking force such that the sum of the target regenerative braking force and the target frictional braking force becomes equal to the target braking force, adjusts the braking force to the target braking force by controlling the regenerative braking device and the frictional braking device based on the target regenerative braking force and the target frictional braking force respectively, gradually reduces a regenerative braking force by gradually reducing the target regenerative braking force, and gradually increases a frictional braking force by gradually increasing the target frictional braking force.

33. The braking force control apparatus according to claim 32, wherein the controller calculates a target braking force for the front wheels based on a required braking amount and a predetermined braking force distribution ratio between the front wheels and the rear wheels, calculates a target regenerative braking force for the front wheels and a target frictional braking force for the front wheels based on the target braking force for the front wheels such that the sum of the target regenerative braking force for the front wheels and the target frictional braking force for the front wheels becomes equal to the target braking force for the front wheels, and adjusts braking forces applied to the front wheels to the target braking force by controlling the regenerative braking device for the front wheels and the frictional braking device for the front wheels based on the target regenerative braking force for the front wheels and the target frictional braking force for the front wheels respectively.

34. The braking force control apparatus according to claim 33, wherein the controller gradually reduces the target regenerative braking force for the front wheels when the regenerative braking forces applied to the front wheels are gradually reduced and gradually increases the target frictional braking force for the front wheels when the frictional braking forces applied to the front wheels are gradually increased.

35. The braking force control apparatus according to claim 32, wherein the controller calculates a target braking force for the rear wheels of the vehicle based on a required braking amount and a predetermined braking force distribution ratio between the front wheels and the rear wheels of the vehicle, calculates a target regenerative braking force for the rear wheels and a target frictional braking force for the rear wheels based on the target braking force for the rear wheels such that the sum of the target regenerative braking force for the rear wheels and the target frictional braking force for the rear wheels becomes equal to the target braking force for the rear wheels, and adjusts braking forces applied to the rear wheels to the target braking force for the rear wheels by controlling the regenerative braking device for the rear wheels and the frictional braking device for the rear wheels based on the target regenerative braking force for the rear wheels and the frictional braking force for the rear wheels respectively.

36. The braking force control apparatus according to claim 35, wherein the controller gradually reduces the target regenerative braking force for the rear wheels when the regenerative braking forces applied to the rear wheels are gradually reduced and gradually increases the target frictional braking force for the rear wheels when the frictional braking forces applied to the rear wheels are gradually increased.

37. The braking force control apparatus according to claim 32, wherein the controller adjusts braking forces applied to the front wheels and braking forces applied to the rear wheels to the target braking force for the front wheels and the target braking force for the rear wheels, respectively, by generating braking forces with a higher priority assigned to the regenerative braking device than to the frictional braking device as to both the front wheels and the rear wheels.

38. The braking force control apparatus according to claim 37, wherein the controller calculates a target braking force for the front wheels based on a maximum regenerative braking force of the regenerative braking device for the front wheels, a required braking amount, and a predetermined braking force distribution ratio between the front wheels and the rear wheels, controls the regenerative braking device for the front wheels with the smaller one of the target braking force for the front wheels and the maximum regenerative braking force defined as a target regenerative braking force for the front wheels, calculates an actual regenerative braking force of the regenerative braking device for the front wheels, and controls the frictional braking device for the front wheels with a value obtained by subtracting the actual regenerative braking force from the target braking force defined as a target frictional braking force for the front wheels.

39. The braking force control apparatus according to claim 38, wherein:

the controller includes a regenerative-braking-device controller that controls the regenerative braking device and a frictional-braking-device controller that controls the frictional braking device, the regenerative-braking-device controller and the frictional-braking-device controller transmit information to each other, the frictional-braking-device controller calculates a target braking force for the front wheels based on a required braking amount and a predetermined braking force distribution ratio between the front wheels and the rear wheels and controls the frictional braking device for the front wheels with a value obtained by subtracting the actual regenerative braking force from the target regenerative braking force defined as a target frictional braking force for the front wheels, and the regenerative-braking-device controller for the front wheels controls the regenerative braking device for the front wheels with the smaller one of the target braking force for the front wheels and the maximum regenerative braking force defined as a target regenerative braking force.

40. The braking force control apparatus according to claim 37, wherein the controller calculates a target braking force for the rear wheels based on a maximum regenerative braking force of the regenerative braking device for the rear wheels, a required braking amount, and a predetermined braking force distribution ratio between the front wheels and the rear wheels, controls the regenerative braking device for the rear wheels with the smaller one of the target braking force for the rear wheels and the maximum regenerative braking force defined as a target regenerative braking force for the rear wheels, calculates an actual regenerative braking force of the regenerative braking device for the rear wheels, and controls the frictional braking device for the rear wheels with a value obtained by subtracting the actual regenerative braking force from the target braking force defined as a target frictional braking force for the rear wheels.

41. The braking force control apparatus according to claim 40, wherein:

the controller includes a regenerative-braking-device controller that controls the regenerative braking device and a frictional-braking-device controller that controls the frictional braking device, the regenerative-braking-device controller and the frictional-braking-device controller transmit information to each other, the frictional-braking-device controller calculates a target braking force for the rear wheels based on a required braking amount and a predetermined braking force distribution ratio between the front wheels and the rear wheels and controls the frictional braking device for the rear wheels with a value obtained by subtracting the actual regenerative braking force from the target regenerative braking force defined as a target frictional braking force for the rear wheels, and the regenerative-braking-device controller for the rear wheels controls the regenerative braking device for the rear wheels with the smaller one of the target braking force for the rear wheels and the maximum regenerative braking force defined as a target regenerative braking force.

42. The braking force control apparatus according to claim 37, wherein at least one of the regenerative braking device for the front wheels and the regenerative braking device for the rear wheels is designed to include a motor-generator that cooperates with an internal combustion engine in a hybrid engine.

43. The braking force control apparatus according to claim 42, wherein a regenerative-braking-device controller for controlling the at least one of the regenerative braking devices is designed as a hybrid-engine control device.

44. The braking force control apparatus according to claim 1, wherein it is determined that the anti-skid control is likely to be started when a lateral acceleration equal to or higher than a predetermined value be applied to the vehicle, and the amount of a gradual decrease in the regenerative braking force and the amount of a gradual increase in the frictional braking force are proportional to the magnitude of the lateral acceleration.

45. The braking force control apparatus according to claim 44, wherein the controller stops regenerative braking of the front wheels if anti-skid control is performed to at least one of a front-left wheel and a front-right wheel of the vehicle.

46. The braking force control apparatus according to claim 45, wherein the controller gradually reduces regenerative braking forces applied to the rear wheels of the vehicle and gradually increases frictional braking forces applied to the rear wheels if anti-skid control is performed to at least one of the front-left wheel and the front-right wheel of the vehicle.

47. The braking force control apparatus according to claim 44, wherein the controller gradually reduces regenerative braking forces applied to front wheels and gradually increases frictional braking forces applied to the front wheels if it is determined that anti-skid control is likely to be started to at least one of a front-left wheel and a front-right wheel of the vehicle.

48. The braking force control apparatus according to claim 47, wherein the controller gradually reduces regenerative braking forces applied to the rear wheels of the vehicle and gradually increases frictional braking forces applied to the rear wheels if it is determined that anti-skid control is likely to be started to at least one of a front-left wheel and a front-right wheel of the vehicle.

49. The braking force control apparatus according to claim 44, wherein the controller stops regenerative braking of the rear wheels if anti-skid control is being performed to at least one of a rear-left wheel and a rear-right wheel of the vehicle.

50. The braking force control apparatus according to claim 49, wherein the controller prohibits gradually reducing regenerative braking forces applied to the front wheels and prohibits gradually increasing frictional braking forces applied to the front wheels if anti-skid control is performed to at least one of the rear-left wheel and the rear-right wheel of the vehicle.

51. The braking force control apparatus according to claim 44, wherein the controller gradually reduces regenerative braking forces applied to the rear wheels and gradually increases frictional braking forces applied to the rear wheels if it is determined that anti-skid control is likely to be started to at least one of a rear-left wheel and a rear-right wheel of the vehicle.

52. The braking force control apparatus according to claim 51, wherein the controller prohibits gradually reducing regenerative braking forces applied to the front wheels and prohibits gradually increasing frictional braking forces applied to the front wheels if it is determined that anti-skid control is likely to be started to at least one of the rear-left wheel and the rear-right wheel of the vehicle.

53. The braking force control apparatus according to claim 46, wherein the controller calculates a target braking force at least based on a required braking amount, calculates a target regenerative braking force and a target frictional braking force based on the target braking force such that the sum of the target regenerative braking force and the target frictional braking force becomes equal to the target braking force, adjusts the braking force to the target braking force by controlling the regenerative braking device and the frictional braking device based on the target regenerative braking force and the target frictional braking force respectively, gradually reduces a regenerative braking force by gradually reducing the target regenerative braking force, and gradually increases a frictional braking force by gradually increasing the target frictional braking force.

54. The braking force control apparatus according to claim 53, wherein the controller calculates a target braking force for the front wheels based on a required braking amount and a predetermined braking force distribution ratio between the front wheels and the rear wheels, calculates a target regenerative braking force for the front wheels and a target frictional braking force for the front wheels based on the target braking force for the front wheels such that the sum of the target regenerative braking force for the front wheels and the target frictional braking force for the front wheels becomes equal to the target braking force for the front wheels, and adjusts braking forces applied to the front wheels to the target braking force by controlling the regenerative braking device for the front wheels and the frictional braking device for the front wheels based on the target regenerative braking force for the front wheels and the target frictional braking force for the front wheels respectively.

55. The braking force control apparatus according to claim 54, wherein
the controller gradually reduces the target regenerative braking force for the front wheels when the regenerative braking forces applied to the front wheels are gradually reduced and gradually increases the target frictional braking force for the front wheels when frictional braking forces applied to the front wheels are gradually increased.

56. The braking force control apparatus according to claim 53, wherein
the controller calculates a target braking force for the rear wheels of the vehicle based on a required braking amount and a predetermined braking force distribution ratio between the front wheels and the rear wheels of the vehicle, calculates a target regenerative braking force for the rear wheels and a target frictional braking force for the rear wheels based on the target braking force for the rear wheels such that the sum of the target regenerative braking force for the rear wheels and the target frictional braking force for the rear wheels becomes equal to the target braking force for the rear wheels, and adjusts braking forces applied to the rear wheels to the target braking force for the rear wheels by controlling the regenerative braking device for the rear wheels and the frictional braking device for the rear wheels based on the target regenerative braking force for the rear wheels and the frictional braking force for the rear wheels respectively.

57. The braking force control apparatus according to claim 56, wherein
the controller gradually reduces the target regenerative braking force for the rear wheels when regenerative braking forces applied to the rear wheels are gradually reduced and gradually increases the target frictional braking force for the rear wheels when frictional braking forces applied to the rear wheels are gradually increased.

58. The braking force control apparatus according to claim 53, wherein
the controller adjusts braking forces applied to the front wheels and braking forces applied to the rear wheels to the target braking force for the front wheels and the target braking force for the rear wheels, respectively, by generating braking forces with a higher priority assigned to the regenerative braking device than to the frictional braking device as to both the front wheels and the rear wheels.

59. The braking force control apparatus according to claim 58, wherein
the controller calculates a target braking force for the front wheels based on a maximum regenerative braking force of the regenerative braking device for the front wheels, a required braking amount, and a predetermined braking force distribution ratio between the front wheels and the rear wheels, controls the regenerative braking device for the front wheels with the smaller one of the target braking force for the front wheels and the maximum regenerative braking force defined as a target regenerative braking force for the front wheels, calculates an actual regenerative braking force of the regenerative braking device for the front wheels, and controls the frictional braking device for the front wheels with a value obtained by subtracting the actual regenerative braking force from the target braking force defined as a target frictional braking force for the front wheels.

60. The braking force control apparatus according to claim 59, wherein:
the controller includes a regenerative-braking-device controller that controls the regenerative braking device and a frictional-braking-device controller that controls the frictional braking device,
the regenerative-braking-device controller and the frictional-braking-device controller transmit information to each other,
the frictional-braking-device controller calculates a target braking force for the front wheels based on a required braking amount and a predetermined braking force distribution ratio between the front wheels and the rear wheels and controls the frictional braking device for the front wheels with a value obtained by subtracting the actual regenerative braking force from the target regenerative braking force defined as a target frictional braking force for the front wheels, and
the regenerative-braking-device controller for the front wheels controls the regenerative braking device for the front wheels with the smaller one of the target braking force for the front wheels and the maximum regenerative braking force defined as a target regenerative braking force.

61. The braking force control apparatus according to claim 58, wherein
the controller calculates a target braking force for the rear wheels based on a maximum regenerative braking force of the regenerative braking device for the rear wheels, a required braking amount, and a predetermined braking force distribution ratio between the front wheels and the rear wheels, controls the regenerative braking device for the rear wheels with the smaller one of the target braking force for the rear wheels and the maximum regenerative braking force defined as a target regenerative braking force for the rear wheels, calculates an actual braking force of the regenerative braking device for the rear wheels, and controls the frictional braking device for the rear wheels with a value obtained by subtracting the actual regenerative braking force from the target braking force defined as a target frictional braking force for the rear wheels.

62. The braking force control apparatus according to claim 61, wherein:
the controller includes a regenerative-braking-device controller that controls the regenerative control device and a frictional-braking-device controller that controls the frictional braking device,
the regenerative-braking-device controller and the frictional-braking-device controller transmit information to each other,
the frictional-braking-device controller calculates a target braking force for the rear wheels based on a required braking amount and a predetermined braking force distribution ratio between the front wheels and the rear wheels and controls the frictional braking device for the rear wheels with a value obtained by subtracting the actual regenerative braking force from the target regenerative braking force defined as a target frictional braking force for the rear wheels, and
the regenerative-braking-device controller for the rear wheels controls the regenerative braking device for the rear wheels with the smaller one of the target braking force for the rear wheels and the maximum regenerative braking force defined as a target regenerative braking force.

63. The braking force control apparatus according to claim 58, wherein at least one of the regenerative braking device for the front wheels and the regenerative braking device for the rear wheels is designed to include a motor-generator that cooperates with an internal combustion engine in a hybrid engine.

64. The braking force control apparatus according to claim 63, wherein a regenerative-braking-device controller for controlling the at least one of the regenerative braking devices is designed as a hybrid-engine control device.

* * * * *